(12) United States Patent
Uhrenholt

(10) Patent No.: US 11,593,265 B2
(45) Date of Patent: Feb. 28, 2023

(54) CACHE ARRANGEMENT FOR GRAPHICS PROCESSING SYSTEMS

(71) Applicant: Arm Limited, Cambridge (GB)

(72) Inventor: Olof Henrik Uhrenholt, Lomma (SE)

(73) Assignee: Arm Limited, Cambridge (GB)

( * ) Notice: Subject to any disclaimer, the term of this patent is extended or adjusted under 35 U.S.C. 154(b) by 85 days.

(21) Appl. No.: 16/821,250

(22) Filed: Mar. 17, 2020

(65) Prior Publication Data

US 2020/0379909 A1    Dec. 3, 2020

(30) Foreign Application Priority Data

Jun. 3, 2019   (GB) ...................................... 1907828

(51) Int. Cl.
| | | |
|---|---|---|
| *G06F 12/00* | (2006.01) | |
| *G06F 12/0842* | (2016.01) | |
| *G06T 1/20* | (2006.01) | |
| *G06T 1/60* | (2006.01) | |
| *G06F 12/0831* | (2016.01) | |

(52) U.S. Cl.
CPC ...... *G06F 12/0842* (2013.01); *G06F 12/0831* (2013.01); *G06T 1/20* (2013.01); *G06T 1/60* (2013.01); *G06F 2212/1044* (2013.01); *G06F 2212/608* (2013.01)

(58) Field of Classification Search
CPC ............. G06F 12/0842; G06F 12/0831; G06F 2212/1044; G06F 2212/608; G06T 1/20; G06T 1/60
See application file for complete search history.

(56) References Cited

U.S. PATENT DOCUMENTS

| | | | | | |
|---|---|---|---|---|---|
| 5,142,671 | A | * | 8/1992 | Ishida | ................. G06F 12/0811 711/119 |
| 5,404,484 | A | * | 4/1995 | Schlansker | ......... G06F 12/0862 712/E9.047 |
| 6,243,791 | B1 | * | 6/2001 | Vondran, Jr. | ........ G06F 12/0846 711/123 |

(Continued)

OTHER PUBLICATIONS

GB Combined Search and Examination Report dated Dec. 3, 2019, GB Patent Application No. GB1907828.6.

(Continued)

*Primary Examiner* — Shawn X Gu
*Assistant Examiner* — Mohammad S Hasan
(74) *Attorney, Agent, or Firm* — Vierra Magen Marcus LLP

(57) ABSTRACT

A graphics processing system is disclosed having a cache system (24) arranged between memory (23) and the graphics processor (20), the cache system comprising a first cache (53) for transferring data to and from the graphics processor (20) and a second cache (54) arranged and configured to transfer data between the first cache (53) and memory (23). When data is to be written from the first cache (53) to memory (23), a cache controller (55) determines a data type of the data and, in dependence on the data type, either causes the data to be written into the second cache (54) without writing the data to memory (23), or causes the data to be written to memory (23) without storing the data in the second cache (54). In embodiments the second cache (54) is write-only allocated.

20 Claims, 8 Drawing Sheets

(56) References Cited

U.S. PATENT DOCUMENTS

| | | | | |
|---|---|---|---|---|
| 6,701,412 B1* | 3/2004 | McDougall | G06F 11/3466 | |
| | | | 711/119 | |
| 9,104,582 B1* | 8/2015 | Mukundan | H04N 21/85406 | |
| 10,613,871 B2* | 4/2020 | Choi | G06F 9/3881 | |
| 2006/0277356 A1* | 12/2006 | Speier | G06F 12/0837 | |
| | | | 711/E12.036 | |
| 2008/0104329 A1* | 5/2008 | Gaither | G06F 12/0888 | |
| | | | 711/138 | |
| 2011/0131381 A1* | 6/2011 | Kaplan | G06F 12/0875 | |
| | | | 711/E12.091 | |
| 2012/0254507 A1* | 10/2012 | Chang | G06F 12/0804 | |
| | | | 711/E12.008 | |
| 2013/0103909 A1* | 4/2013 | Pangborn | G06F 12/0888 | |
| | | | 711/138 | |
| 2013/0282987 A1* | 10/2013 | Koob | G06F 12/0831 | |
| | | | 711/E12.017 | |
| 2014/0075125 A1* | 3/2014 | Biswas | G06F 12/08 | |
| | | | 711/136 | |
| 2014/0244902 A1* | 8/2014 | Simionescu | G06F 12/0802 | |
| | | | 711/138 | |
| 2016/0035128 A1* | 2/2016 | Zhao | G06T 15/005 | |
| | | | 345/522 | |
| 2018/0301125 A1 | 10/2018 | Haraden | | |
| 2018/0349291 A1* | 12/2018 | Klingauf | G06F 12/12 | |
| 2019/0096027 A1* | 3/2019 | Fielding | G06F 12/0811 | |

OTHER PUBLICATIONS

GB Combined Search and Examination Report dated Dec. 20, 2021, GB Application No. GB2114513.1.

Chen, Chao et al., "DRAM write-only-cache for improving lifetime of phase change memory", 2016 IEEE 59th International Midwest Symposium on Circuits and Systems (MWSCAS), Oct. 16-19, 2016, 4 pages.

\* cited by examiner

CACHE ARRANGEMENT FOR GRAPHICS PROCESSING SYSTEMS

BACKGROUND

The technology described herein relates to graphics processing systems and in particular to cache operations in a graphics processing system.

Graphics processing is normally carried out by first splitting the scene to be displayed into a number of similar basic components or "primitives", which primitives are then subjected to the desired graphics processing operations. The graphics "primitives" are usually in the form of simple polygons, such as triangles.

Each primitive is at this stage defined by and represented as a set of vertices. Each vertex for a primitive has associated with it a set of data (such as position, colour, texture and other attributes data) representing the vertex. This "vertex data" is then used, e.g., when rasterising and rendering the primitive(s) to which the vertex relates in order to generate the desired render output of the graphics processing system.

Thus, once primitives and their vertices have been generated and defined, the primitives can be processed by the graphics processing system, in order, e.g., to display the frame. This processing basically involves determining which sampling points of an array of sampling points covering the output area to be processed are covered by a primitive, and then determining the appearance each sampling point should have (e.g. in terms of its colour, etc.) to represent the primitive at that sampling point. These processes are commonly referred to as rasterising and rendering, respectively.

Some graphics processing systems use so-called "tile-based" rendering. In tile-based rendering, rather than the entire render output (e.g., frame) effectively being processed in one go as in immediate mode rendering, the render output, e.g., an output frame to be displayed, is divided into a plurality of smaller sub-regions, usually referred to as "tiles". Each tile (sub-region) is rendered separately (typically one-after-another), and the rendered tiles (sub-regions) are then recombined to provide the complete render output, e.g., frame for display. In such arrangements, the render output is typically divided (by area) into regularly-sized and shaped rendering tiles (e.g. typically squares or rectangles). (Other terms that are commonly used for "tiling" and "tile-based" rendering include "chunking" (the rendering tiles are referred to as "chunks") and "bucket" rendering. The terms "tile" and "tiling" will be used hereinafter for convenience, but it should be understood that these terms are intended to encompass all alternative and equivalent terms and techniques wherein the render output is rendered as a plurality of smaller area sub-regions.)

The advantage of such tile-based rendering is that primitives that do not appear in a given tile do not have to be processed for that tile, and therefore can be ignored when the tile is processed. This can allow the overall amount of graphics processing necessary for a given render output to be reduced. However, this means that in a tile-based rendering system, it is accordingly usually desirable to be able to identify and know up-front those primitives that are actually present in a given tile (i.e. sub-region).

In order to facilitate this, it is known to prepare lists of the primitives to be rendered for each tile (e.g. that will appear in the tile). Such a "tile-list" (which is also often referred to as a "primitive list" or "polygon list") identifies, e.g. by reference to a primitive indicator, the primitives to be rendered for a tile in question. The process of preparing tile-lists for tiles to be rendered basically therefore involves determining the primitives that should be rendered for a given tile. This process is usually carried out by determining (at a desired level of accuracy) the primitives that intersect (i.e. that will appear (at least in part) within) a tile in question, and then preparing a list of those primitives for future use by the graphics processing system. (It should be noted here that where a primitive falls into more than one tile, as will frequently be the case, it is included in a tile-list for each tile that it falls within.) In effect, a tile can be considered to have a bin (the tile-list) into which any primitive that should be processed for the tile is placed (and, indeed, the process of sorting the primitives on a tile basis in this manner is commonly referred to as "binning").

In a tile-based rendering system, a rendering job is therefore effectively split into two distinct processing passes. The first pass executes (at least) geometry related processing (e.g. vertex shading), and generates the tile-lists indicating which primitives contribute to each tile. This is normally performed by processing the data for the primitives in a pipelined fashion, e.g. by performing a series of processing steps such as obtaining the vertex data for the primitives (i.e., primitive assembly, which may include various geometry processing steps), bounding, binning, etc.. Geometry data for, and/or generated as part of this processing, is typically written into a geometry buffer until the tile-list generation is complete, and the processing can progress to the next processing step.

The second processing pass then rasterises the primitives for each tile into individual graphics fragments for processing, and executes the required fragment processing for rendering these fragments, on a tile-by-tile basis, writing the rendered tiles back to memory (e.g. into a frame buffer) as they are completed.

The overall graphics processing pipeline for a tile-based graphics processing system thus typically includes a geometry processing stage that takes as its input raw geometry (e.g. position and attribute) data stored in the memory system and processes that data to obtain transformed geometry (e.g. transformed position and attribute) data for the primitives making up the render output (e.g. the image to be displayed), and prepares the tile-lists. Once the tile-lists have been prepared, and written back to memory (along with the transformed geometry data), the primitives for each tile are then rasterised into individual graphics fragments for processing by the graphics processing unit (processor), with the fragments being sent to a fragment shading stage that performs the appropriate fragment processing operations on the fragments to generate the required fragment data, etc., for render output. The processed fragment data is then written into a suitable tile buffer, such that once all of the fragments to be rendered for a particular tile have been processed, the fully rendered tile can then be written back to an output frame buffer, from which it can be read out (along with the other rendered tiles once they have been processed) to generate the entire render output.

Thus, when rendering a particular output (e.g. frame) in a tile-based graphics processing system, data is generated at various stages of the graphics processing pipeline that is temporarily held, e.g. in one or more associated buffers, until that data is ready to be used and passed onto the next stage of the graphics processing pipeline. This data is thus written by the graphics processing unit (GPU) into associated storage (e.g. its associated buffer), from which it can subsequently be read out as the graphics processing operation progresses. Such data is thus variously transferred between the GPU and the memory system during the graphics processing operation, with an associated memory "bandwidth" cost representing the amount of data that needs to be transferred to/from memory.

As GPUs become larger (and graphics content more complex) increasingly larger amounts of memory bandwidth are consumed by graphics processing operations. The power cost of moving such data back and forth from memory during a graphics processing operation may thus represent a significant portion of the overall power budget. Thus, particularly for system on chip (SoC) mobile devices, or other devices with limited bandwidth and power resource, it would be desirable to try to reduce the amount of memory bandwidth required.

To this end it might be considered to try to implement a cache arrangement to hold data more locally to the GPU so as to reduce the instances of having to access the relatively slower data stores, e.g., and in particular, in main memory. However, the Applicants have recognised that simply attempting to cache any and all data traffic flowing to and from the GPU may not be the most efficient use of cache resource. Accordingly, the Applicants believe that there is scope for improvements in this regard.

BRIEF DESCRIPTION OF THE DRAWINGS

Embodiments of the technology described herein will now be described by way of example only and with reference to the accompanying drawings, in which.

DETAILED DESCRIPTION

Figure 1:
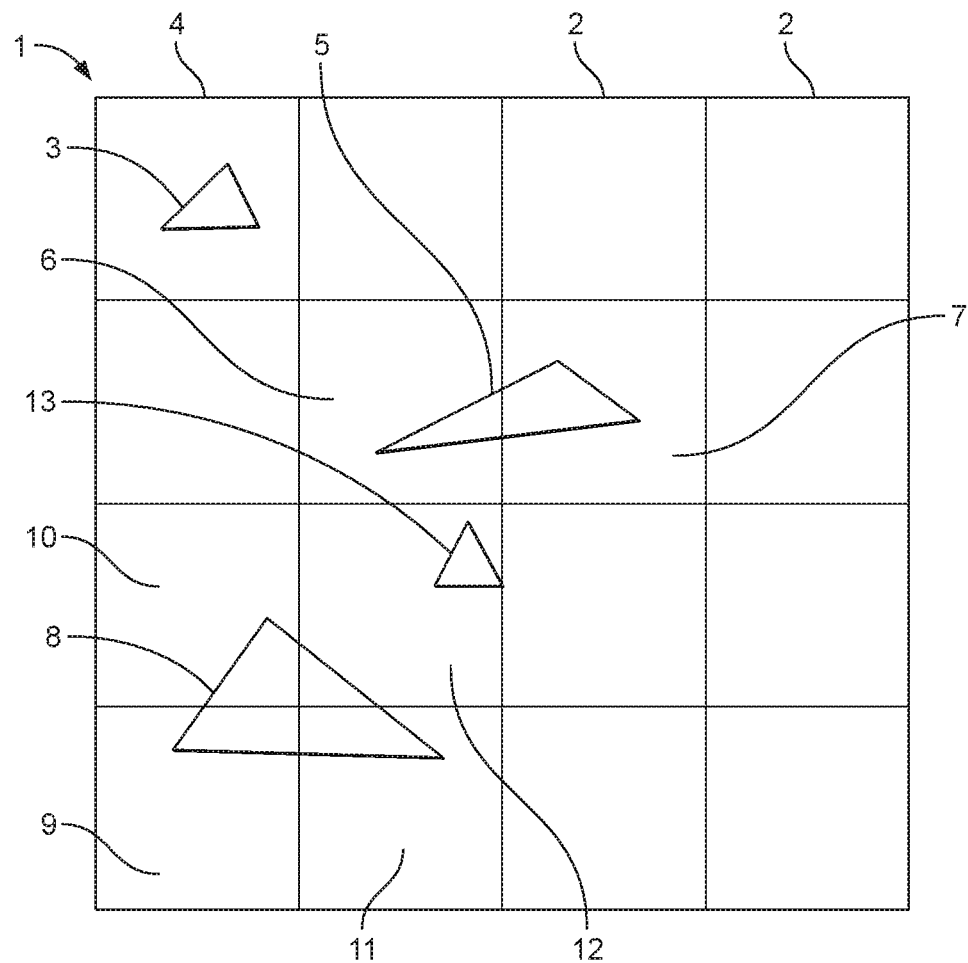
FIG. 1 shows schematically a tile-based graphics processing arrangement.

A first embodiment of the technology described herein comprises a graphics processing system comprising:
  a memory system;
  a graphics processor; and
  a cache system arranged between the memory system and the graphics processor and configured to transfer data between the memory system and the graphics processor for use by the graphics processor when generating a render output;

the cache system comprising:
  a first cache configured to transfer data to and from the graphics processor for use when generating a render output;
  a second cache arranged and configured to transfer data between the first cache and the memory system; and
  a cache controller that is configured to, when data is to be written from the first cache to the memory system, determine a data type of the data that is to be written and to, in dependence on the determined data type, either cause the data to be written into the second cache without writing the data to the memory system, or to cause the data to be written to the memory system without storing the data in the second cache.

A second embodiment of the technology described herein comprises a method of processing graphics using a graphics processing system comprising: a memory system; a graphics processor; and a cache system arranged between the memory system and the graphics processor and operable to transfer data between the memory system and the graphics processor for use by the graphics processor when generating a render output, the cache system comprising a first cache operable to transfer data to and from the graphics processor for use when generating a render output, a second cache arranged and operable to transfer data between the first cache and the memory system, and a cache controller, the method comprising:

when data is to be written from the first cache to the memory system during a graphics processing operation, the cache controller determining a data type of the data to be written and, in dependence on the determined data type, either writing the data into the second cache without writing the data to the memory system, or writing the data to the memory system without storing the data in the second cache.

The technology described herein at least in embodiments relates to a tile-based graphics processing system (although this not need be the case and the technology described herein may also find utility in other types of graphics processing systems). Thus, the first and second embodiments of the technology described herein presented above may relate respectively to a tile-based graphics processing system, and a method of processing graphics using a tile-based graphics processing system. When generating a render output within graphics processing systems, and particularly within such tile-based systems, various data traffic (e.g. geometry and fragment data) may flow between the graphics processing unit (processor) and the memory system. In order to reduce the need to access the relatively slower memory system, and save memory read/write bandwidth, it may be desirable to transfer at least some of this data using relatively faster storage, i.e. a cache, within the memory hierarchy. That is, rather than having to transfer data directly between the memory system and the graphics processing unit (processor), the data may be at least temporarily stored in one or more caches (a cache system) disposed between the graphics processing unit (processor) and the memory system.

In such arrangements, when data is required to be read in from memory (or written back to memory) for a graphics processing operation being performed by the graphics processing unit (processor), a read (or write) request for that data may thus be issued to the cache system. That is, the read (or write) operation will proceed via the cache system, and in the case of a read operation, for example, if the data is already available in the appropriate cache (there is a cache "hit"), the graphics processing unit (processor) will use the data from the cache without having to go to the associated data store, e.g. in main memory.

Such arrangements can therefore work well to reduce the instances of having to access the relatively slower memory system and thereby save memory bandwidth and/or improve throughput within the graphics processing system.

However, the Applicants have recognised that simply attempting to cache any and all data in a single cache may not be the most efficient use of cache resource. The technology described herein thus provides a more efficient arrangement for caching data that is used in a (e.g. tile-based) graphics processing system.

In the technology described herein, the cache system that connects to the (main) memory system of the graphics processing system and that is used to cache data being generated and/or used by the graphics processing unit (processor) comprises (at least) two caches.

In particular, the cache system comprises a first cache that is operable to transfer data to and from the graphics processing unit (processor), and a second cache that is disposed between the first cache and the memory system and is operable to transfer data between the memory system and the first cache. Thus, the graphics processing unit (processor) generally interfaces with the first cache of the cache system, which in turn interfaces with the second cache that interfaces with the memory system. (Naturally, the first and second caches need not interface directly with the graphics processing unit (processor) or the memory system (or each other), and various other levels of caches may be included in the graphics processing system. For instance, the first cache may interface with a higher cache (e.g. an L1 cache) of the graphics processing unit (processor). Various other arrangements would of course be possible.)

A cache controller is provided for controlling the operation of the cache system. In particular, the second cache may be used to cache only certain (selected) types of data. For example, when data is to be written from the first cache to memory, the cache controller is operable to first determine a data type of the data to control whether that data is processed (i.e. cached) using the second cache or not (in which case the data in an embodiment bypasses the second cache and goes straight to the memory system without being stored in the second cache i.e. such that the data cannot subsequently be retrieved from the second cache).

Thus, when a write request is issued for some data to be written back from the first cache to the memory system, the technology described herein first checks the type of data that is to be written. If the data is of a data type that should not be cached using the second cache (e.g. because it is expected that data of that type cannot be efficiently cached using the second cache (and so in embodiments data of that data type is not cached using the second cache)), the cache controller can determine this, and then cause the data to be written to the memory system without storing the data in the second cache.

However, where the data is a data type that is to be cached using the second cache, the cache controller can determine this and then cause this data to be processed using the second cache accordingly. For example, if an entry (e.g. a cache line) for the data is not already present in the second cache (i.e. there is a cache miss for that data in the second cache), a line of the second cache can be allocated for that data and the data can then be written to the second cache. Correspondingly, if a line of the second cache has already been allocated for that data (i.e. there is a cache hit), the cache entry (line) can then be updated with the new data (value) overwriting the existing entry.

At this point, when data of a data type that is to be cached using the second cache is to be written back from the first cache, the data is thus written into the second cache without being written to the memory system. In some cases the data that is written into the second cache may subsequently be written back to memory, e.g. if some data needs to be evicted from the second cache in order to free up cache lines for new data. However, in embodiments (at least some of) the data stored in the second cache may be used and ultimately discarded without ever being written back to memory. For example, as explained further below, once a processing job (or set of jobs) using the data in the second cache has completed, in an embodiment the entire second cache is invalidated, such that the data in the second cache can then be discarded without being written back to memory.

The technology described herein thus allows certain (selected) types of data to be handled using the second cache, in an embodiment without having to write this data to the memory system, thereby significantly reducing the bandwidth for memory writes. However, at the same time other types of data, e.g., data types that cannot be efficiently processed using the second cache (e.g. because the data of that type is expected to be too large to be effectively cached), and whose presence in the second cache may be detrimental to the cache performance (e.g. by 'trashing' the cache and causing other data that could be more efficiently cached to be evicted before it can be used), can instead be caused to bypass the second cache and be written back to the memory system, i.e. without attempting to store this data in the second cache.

Cache resource in the second cache can thus be used where it is expected to be of most benefit. This allows for a more efficient use of cache resource than attempting to cache in the second cache any and all data that is being transferred to/from the first cache of the cache system. Thus, a cache system of the technology described herein may provide a number of advantages compared to other arrangements for caching data in a (e.g. tile-based (deferred)) graphics processing system.

For instance, in some modern graphics processing systems, the graphics processing unit (processor) already has access to a sizable L2 cache (e.g. on the order 2-4 MB). This L2 cache is both read and write allocated and operable to cache any data traffic flowing between the graphics processing unit (processor) and memory. This L2 cache can generally be efficient in caching at least some of this data.

Surprisingly however the Applicants have found that making this L2 cache larger does not necessarily give any substantial performance or bandwidth benefits, e.g. especially when attempting to cache certain types of data flows that may extend across multiple processing jobs, or render passes.

For instance, in a tile-based graphics processing system there are typically two main data flows: a geometry data flow (e.g. involving the input raw geometry data, and the transformed position and attribute data that is generated during vertex shading and written back from the graphics processing unit (processor) into associated geometry buffers, along with the tile-lists, etc.) and a fragment data flow (e.g. involving the fragment data that is processed for each tile and written out for each rendered tile to the frame buffer when generating the render output).

The geometry processing stage of a tile-based renderer will thus generate various transformed position and attribute data for the primitives (i.e. from the vertex shading, tessellation, geometry shading, etc.) that is written out from the graphics processing unit (processor), along with the required tile-lists (as well as any associated pointer tables, etc.) into associated buffers until the geometry processing is complete and the geometry data can then be passed onto the next stages of the graphics processing pipeline, e.g. for rasterising and rendering. The data generated during these geometry processing jobs is typically temporarily held in an associated buffer before it is provided as input for the next processing stage. The geometry buffers thus include, for example, transformed position and attribute data, tile-lists, etc.

This geometry data may be purely intermediate (or temporary), i.e. it will eventually be consumed by during a graphics processing operation (and then no longer required). For example, the geometry data may be consumed by the connected fragment processing job. As another example, particularly when transform feedback is enabled, the geometry buffers may be copied to an output buffer (which may, e.g., be visible to the application that is causing the graphics processing operation to be performed). However, once the geometry buffer has been copied to the output buffer, at that point it is then no longer needed. The lifetime of these geometry buffers (measured in terms of clock cycles between production and consumption of the associated geometry data) can be relatively long. This type of data is typically therefore not efficiently cached by the L2 cache since it may be evicted before it can be used (such that it needs to be repeatedly fetched into the L2 cache, consuming more bandwidth).

Another example involving data extending across different processing jobs would be fragment data that is to be written into the frame buffer, e.g. for displaying the final render output. For example, the frame buffer typically includes colour/depth buffer writes, as well as texture reads, etc. Thus, in a first render job, a frame buffer is rendered as output, which may then be read back in as an input texture for a subsequent render job. However, the frame buffer is often relatively large (and typically larger than the geometry buffers), and the entire frame buffer may not therefore fit into a typical L2 cache (for example, a frame buffer for a 1080 pixel frame may be about 4 MB, depending on the compression scheme used). Even if the size of the L2 cache were to be increased such that the entire frame buffer could fit into the L2 cache, the lifetime of this frame buffer data is still relatively long, such that in typical cache arrangements the data may still be evicted from the L2 cache before it was (re)used.

One approach for attempting to cache these data flows would be to integrate a further (larger) cache such as an L3 cache between the L2 cache and main memory. However, simply adding a further read and write allocated cache below the L2 cache is similar to making the L2 cache larger, and therefore may still not be the most efficient use of cache resource. Accordingly this may not be the best solution especially for applications where the area available for cache resource might be limited, e.g. for system-on-chip mobile devices.

By contrast, the technology described herein allows a more efficient use of cache resources since it is possible to use the cache resource of the second cache to cache only certain (selected) types of data that it is expected can be effectively cached in the second cache.

In particular, the second cache is in an embodiment used for caching intermediate data generated by the graphics processing unit (processor), for example, of the type(s) described above, i.e. temporary data that is generated and consumed during a (set of one or more processing jobs for a) graphics processing operation, but that need not be preserved beyond the current processing job (or jobs) using the data. Thus, in embodiments, the cache controller causes at least some types of intermediate (temporary) data that is generated by the graphics processing unit (processor) during the generation of a render output, and that is to be written out to memory, to be written into the second cache.

For instance, the second cache is in an embodiment used for caching geometry data that is generated during the geometry processing steps of a graphics processing operation in a tile-based graphics processing system. For example, the second cache may be (and in an embodiment is) used to cache (at least) transformed position and attribute data (e.g. as generated from the vertex shader), in an embodiment as well as tile-lists, and/or associated pointer tables, etc., generated from the geometry processing steps. This geometry data is temporarily held until the connected fragment processing job(s) requiring the data is(/are) ready to proceed. However, the geometry data is then entirely consumed during the associated fragment job and it can be guaranteed that the transformed geometry data will not be re-used after the fragment job(s) using that data is complete, such that the data could therefore be (and in an embodiment is) discarded at that point. In other words, as discussed above, this geometry data is therefore purely intermediate (i.e. temporary) data. Thus, in embodiments the cache controller is configured to cause intermediate geometry data that is generated by the graphics processor when generating a rendering output to be written into the second cache.

The second cache may (also) in embodiments be used to cache frame buffer data. That is, in some embodiments, the cache controller is configured to cause frame buffer data to be written into the second cache (as well as geometry data). For example, the second cache may be used to cache colour/depth data for rendered fragments that is generated by the graphics processing unit (processor) when generating a render output. This may particularly (but not exclusively) be the case for instance where the frame buffer data is re-used as texture input when rendering the next frame but does not need to be stored beyond that, and is also therefore intermediate (i.e. temporary) data that can be discarded potentially without ever being written to memory (and that in an embodiment therefore is not written to memory) but can advantageously be cached using the second cache. However, other arrangements would of course be possible.

In the technology described herein the types of data that are cached using the second cache may generally be selected based on a known cache size and the expected size of working sets of data items of that type, e.g. such that all of the data of that type that may be desired to be written during a particular graphics processing operation (i.e. a set of one or more processing jobs) may be expected to fit entirely into the second cache.

For relatively larger second caches (e.g. significantly larger than the expected size of the frame buffer, e.g. a second cache of the order 8-16 MB, depending on the implementation), it may be advantageous to cache both geometry and fragment (frame buffer) data that is being written from the first cache to the second cache. That is, depending on the size of the second cache, i.e. provided that the second cache is large enough to efficiently cache such data, the second cache may advantageously be used to cache both geometry and frame buffer data. However, this may not always be realistic, especially for mobile devices wherein the available area for cache resource may be limited.

Thus, for smaller second caches (e.g. of the order about 2-4 MB), an improved performance may be achieved by operating the second cache to only cache geometry data (i.e. and not fragment (frame buffer) data). For instance, in that case, the fragment data, e.g. for an entire frame buffer, is expected to be too large to fit into the second cache. There is therefore little benefit in caching this data in the second cache. Thus, by caching only the geometry data in the second cache it can be ensured that the geometry data can be efficiently cached without risk of the fragment data interfering with this (e.g. by causing the geometry data to be evicted before it has been used, leading to trashing of the cache).

Thus, depending, e.g., on the size of the second cache, in some embodiments the second cache is used only to cache intermediate geometry data, with the cache controller causing fragment (and other) data to effectively bypass the second cache and instead pass straight to memory. However, various other arrangements would of course be possible.

As explained already, it will be appreciated that the geometry data (and optionally also the frame buffer data, e.g. depending on the size of the second cache) that is in an embodiment cached using the second cache is intermediate data, i.e. temporary data that is generated and consumed during a (set of one or more processing jobs for a) graphics processing operation, but that need not be preserved beyond the current processing job (or jobs) using the data.

Thus, it will be appreciated that this purely intermediate (temporary) data does not need to persist beyond the processing job(s) using the data and need not therefore necessarily ever be written to the memory system. This data can therefore be, and according to the technology described herein in an embodiment is, discarded once the processing job(s) requiring that data has completed without writing the data back to memory (unlike in more conventional cache arrangements where any data that is evicted may be flushed from the cache system and written back to the memory system).

In an embodiment therefore the second cache is invalidated (either entirely or in part) after the processing job (or set of processing jobs) using the data in the second cache has completed such that this data can be discarded without writing the data back to the memory system. Thus, in embodiments, once a set of one or more processing job(s) using the data in the second cache has completed, the cache controller is configured to invalidate the second cache so that the data in the second cache can be evicted without writing the data to the memory system.

That is, the second cache is in an embodiment not only able to cache the intermediate data, e.g. of the type(s) described above, but is also able to discard such data after it has been used without that data being written back to memory. So, any intermediate data that is only used during a particular set of processing jobs (that may be associated with the rendering of a particular frame, for example), can be discarded once the processing job(s) are completed (and it is known that this data will not need to be used again). Thus, in embodiments, when a set of processing jobs using the data in the second cache has completed, this is indicated to the cache controller, and the cache controller in an embodiment then invalidates the data in the second cache in its entirety. For example, the graphics processing unit (processor) may signal to the cache controller when the processing job(s) using the data in the second cache has completed to cause the cache controller to invalidate the entire second cache whereby the data in the second cache can then be (and ultimately is) evicted without writing the data to the memory system.

By invalidating such data in the second cache at this point, i.e. once the processing job(s) requiring the data have completed, the data can be discarded without writing back to memory, thereby saving significant portions of memory bandwidth. This works well in part because the second cache is controlled to only cache certain (selected) types of data that are expected to fit into the second cache, such that it is relatively unlikely that the data will be evicted from the second cache before it is used (i.e. to free up a cache entry for new data). Thus, in embodiments, data of the data type(s) being cached using the second cache is never written back to the memory system.

In an embodiment, the entire second cache is invalidated once the set of processing jobs using the data in the second cache have completed. However, it would also be possible to only invalidate the second cache in part once a set of processing jobs using the data in the second cache have completed. For example, where the second cache is operable to cache multiple types of data (e.g. geometry and frame buffer data), the entries (lines) in the second cache may be selectively invalidated to only invalidate data of whatever type (e.g. geometry data) the completed processing job(s) were using. Any entries (lines) that are marked as invalid can then be evicted without writing the data back to memory. On the other hand, any other data (e.g. that has not yet been used) may remain as valid in the second cache and/or may be written back to memory, as required.

In an embodiment, the second cache in the technology described herein is allocated only on write requests (i.e. the second cache is in an embodiment a "write-only allocated" cache). That is, a cache line of the second cache is allocated in response to a cache miss on a write request to the second cache, but no cache lines are allocated in response to a cache miss on a read request to the second cache. Thus, in embodiments, the second cache is write-only allocated such that in response to a miss in the second cache on a request to write data to the second cache, a cache line of the second cache is allocated for the data such that the data can then be written to the second cache, whereas in response to a miss in the second cache on a request to read data from the second cache, a cache line of the second cache is not allocated and the read request is passed to the memory system. (By contrast the first cache is in an embodiment both read and write allocated and is in an embodiment operable to cache any (and all) data types that are to be transferred between the graphics processing unit (processor) and the memory system.)

It has been found that by making the second cache write-only allocated it is possible to more efficiently cache the intermediate data flows described above. For instance, because the second cache is controlled to only cache certain (selected) types of data being written to the second cache, and because the second cache is in an embodiment allocated only on write requests, it can be ensured that most (if not all) of the data that is being cached in the second cache can be processed using only the second cache, without ever having to write the data back to the memory system, thus saving significant memory write bandwidth.

The technology described herein thus particularly allows these types of intermediate data flows to be more efficiently cached by the second cache. The technology described herein also in an embodiment allows such intermediate data to be discarded from the second cache after it has been used without having to write the data back to the memory system to save memory bandwidth. For instance, at the end of a set of one or more processing jobs using the data in the second cache, the graphics processing unit (processor) may, and in an embodiment does, signal to the cache (controller) that the data in the second cache can be invalidated without writing the data back to the memory system, since it can be guaranteed that this intermediate data will not be used again.

However, other data that cannot be effectively cached in the second cache can essentially pass straight through the second cache. For instance, there may be some data types that cannot reasonably fit into the second cache. In that case, allocating cache lines for data of that data type not only does not provide the advantages described above but may in fact be detrimental to the overall cache performance.

The use of a write-only allocated second cache may be advantageous in itself even without controlling the second cache to only cache certain (selected) data types, i.e. even when all data that is to be written from the first cache to memory is cached using the second cache (which may be appropriate, for example, for a relatively larger second cache). In that case, in a similar manner as described above, the addition of a second write-only allocated cache allows all writes to be cached efficiently with a reduced write memory bandwidth. That is in a similar manner as described above the second cache can be used for caching the data that is being written back by the graphics processing unit (processor) and arranged to reduce (or even eliminate) the instances of having to write this data to the memory system. Read memory bandwidth can still be saved for any data that has been written into the second cache, but cache lines are not allocated for new data in response to a miss on a read request, and so read requests do not cause any data that is written into the second cache to be evicted, reducing the possibility for cache trashing.

A further embodiment of the technology described herein comprises a graphics processing system comprising:
  a memory system;
  a graphics processor; and
  a cache system arranged between the memory system and the graphics processor and configured to transfer data between the memory system and the graphics processor for use by the graphics processor when generating a render output;
  the cache system comprising:
  a first cache configured to transfer data to and from the graphics processor for use when generating a render output; and
  a second cache arranged and configured to transfer data between the first cache and the memory system, wherein the second cache is write-only allocated such that in response to a cache miss in the second cache on a write request a cache line of the second cache is allocated for the data such that the data can then be written to the second cache, whereas in response to a miss in the second cache on a read request a cache line of the second cache is not allocated and the read request is passed to the memory system.

Another embodiment of the technology described herein comprises a method of processing graphics using a graphics processing system comprising: a memory system; a graphics processor; and a cache system arranged between the memory system and the graphics processor and operable to transfer data between the memory system and the graphics processor for use by the graphics processor when generating a render output, the cache system comprising a first cache operable to transfer data to and from the graphics processor for use when generating a render output, a second cache arranged and operable to transfer data between the first cache and the memory system, the method comprising:
  when data is to be written from the first cache to the memory system, issuing a write request for that data to the second cache, and in response to the write request missing in the second cache, allocating a cache line in the second cache for that data; and
  when data is to be read from the second cache into the first cache, issuing a read request for that data to the second cache, and in response to the read request missing in the second cache, passing the read request to the memory system without allocating a cache line in the second cache.

It will be understood that the graphics processing system and method according to these further embodiments may have or comprise any or all features described herein in relation to the first and second embodiments, at least to the extent that these features are not mutually exclusive. In particular, it will be appreciated that the cache system according to these further embodiments may comprise a cache controller that is operable to perform any of the operations described above in relation to the first and second embodiments. Again, these further embodiments may relate to tile-based graphics processing systems (although arrangements would be possible).

Thus, it will be appreciated that the technology described herein according to its various embodiments may provide various benefits compared to other cache arrangements and provides a more efficient way of caching intermediate data generated especially during tile-based rendering, thereby improving the overall performance of the graphics processing system.

At least in embodiments, the technology described herein relates to the caching of graphics data that is generated and used by a graphics processor (graphics processing unit) in particular operating a tile-based (deferred) graphics processing scheme.

In the technology described herein, the cache system that connects to the (main) memory system of the graphics processing system and that is used to cache data for use by the graphics processing unit (processor) comprises two caches.

The memory (memory system) of the graphics processing system that the cache system of the technology described herein interfaces with may comprise any suitable and desired memory and memory system of the graphics processing system (e.g. of the overall data processing system that the graphics processing system is part of), such as, and in an embodiment, a main memory for the graphics processing system (e.g. where there is a separate memory system for the graphics processor), or a main memory of the data processing system that is shared with other elements, such as a host processor (CPU), of the data processing system. Other arrangements would, of course, be possible.

In an embodiment, the first cache comprises an L2 cache of the main cache hierarchy of the memory system (e.g. of the graphics processing system). The first cache is thus in an embodiment local to and dedicated for the graphics processing unit (processor). For example, in an embodiment the first cache feeds into an L1 cache of the graphics processing unit (processor), which in turn feeds the processor (cores).

The second cache in an embodiment interfaces with the first cache. In an embodiment, where the first cache is an L2 cache, the second cache is an L3 cache that (directly) feeds the first cache. The second cache may be dedicated for the graphics processing unit (processor). That is, in some embodiments, the second cache is local to the graphics processing unit (processor) and is used only for transferring data to/from the graphics processing unit (processor). However, in some embodiments, the second cache is a shared cache resource that is accessible by both the graphics processing unit (processor) and also a host processor (CPU) of the data processing system of which the graphics processing system is a part of.

However, various other arrangements would of course be possible.

The first and second caches of the cache system of the technology described herein can be configured in any suitable and desired manner, and can, e.g., and in an embodiment, include any desired and suitable number of cache lines. They in an embodiment each comprise a plurality of cache lines.

The first and second caches may be the same size (e.g. in terms of their storage capacity (e.g. number of cache lines)), but more typically the second cache (that interfaces with and receives data from the memory) is larger (has a greater capacity (number of cache lines) than the first cache (that interfaces with and receives data from the graphics processing unit (processor))).

Subject to the particular features for the first and second caches that will be discussed herein, those caches can otherwise be configured and operate in any suitable and desired manner, such as, and in an embodiment, in dependence on and according to the normal cache mechanisms for the graphics (data) processing system in question. Thus they may, for example, and in an embodiment do, use normal cache operations and processes, such as least recently used (LRU) processes, to identify and free-up cache lines for use, etc., and to control the storing of data in the caches. Other arrangements would of course be possible.

The cache system (e.g. the second cache of the cache system) of the technology described herein may interface with and receive data from the (main) memory (and memory system) in any suitable and desired manner. In embodiments, the second cache receives the data that is stored in the (main) memory directly from memory. However, it is also contemplated that the second cache may receive the data that is stored in the (main) memory via a further cache of the (main) memory system.

Similarly, the first cache of the cache system of the technology described herein (i.e. that interfaces with, and provides data to, the graphics processing unit (processor) for use when generating a render output) can interface with the graphics processing unit (processor) in any suitable and desired manner.

The cache system is generally used for holding data between the graphics processing unit (processor) and the memory system. When performing a graphics processing operation, the graphics processing unit (processor) will thus send appropriate read or write memory requests to the memory system for data. For instance, when the graphics processing unit (processor) requires some input data that is presumed to reside in the memory system, a read request for that data is sent to the memory system. Similarly, when it is required to write data back from the graphics processing unit (processor), a write request for that data is sent to the memory system.

In such arrangements, when a read/write memory request for data is issued to the memory system, it will be first determined whether the data is available in the appropriate cache (a cache "lookup"). In other words, the read/write memory request is first issued to the cache system, with the memory requests being passed through the memory hierarchy, i.e. from the graphics processing unit (processor) to the first cache, and then onto the second cache, and ultimately to the memory system, as required.

In the technology described herein, the way in which a read/write request is handled by the cache system in an embodiment depends on the type of data that is the subject of the request. For example, as explained above, in an embodiment the second cache is used only to cache certain (selected) types of data.

For example, in response to a write request to write data from the first cache to the memory system, the cache controller will first check whether (or not) the data is of a data type that should be processed using the second cache (e.g. in embodiments to check whether the data is intermediate geometry data, and optionally also frame buffer data, depending on the size of the cache). Thus, when data is to be written from the first cache to the memory system, the cache controller is configured to determine a data type of the data that is to be written and to, in dependence on the determined data type, either cause the data to be written into the second cache without writing the data to the memory system, or to cause the data to be written to the memory system without storing the data in the second cache.

For instance, if the write request is for data of a data type that is not to be cached using the second cache, a cache line in the second cache is not allocated for the data, and the write request is passed down to the memory system with the data being written into the memory system accordingly (effectively bypassing the second cache). The memory system can then issue a suitable write response which may be passed back up through the cache system.

On the other hand, if the write request is for data of a data type that should be cached using the second cache, this data is then processed using the second cache in the usual fashion. For instance, the second cache is first checked for this data (a cache lookup). If an entry for the data is not already present in the second cache (i.e. there is a cache miss), a cache line of the second cache is then allocated for the data, and the data (value) can then be written to the second cache once the allocated line becomes available. On the other hand, if a cache line (entry) has already been allocated for that data, it is not necessary to allocated a new cache line, and the existing cache line (entry) can be updated, e.g. by overwriting the existing data (value) with the new data (and optionally also incrementing a (usage) counter for that cache line, etc.).

Where a cache line needs to be allocated in response to a write request but the second cache is full (such that there are no empty lines available to be allocated for the data) one of the cache lines of the second cache may be evicted. A cache line may be selected for eviction based on any suitable eviction policy. For example, a least-recently-used policy may be used for evicting cache lines. However, other arrangements would of course be possible and any suitable cache replacement policy may be used.

Correspondingly, in embodiments, when data is to be read from the second cache, the cache controller is configured to determine a data type of the data that is to be read and to, when it is determined that the data is of a data type that is to be cached using the second cache, check whether the data is present in the second cache, and if the data is present in the second cache, to read the data from the second cache, whereas if the data is not present in the second cache, to read the data from the memory system.

On the other hand, when it is determined that the data is of a data type that is not to be cached using the second cache, the cache controller is configured to read the data from the memory system without checking the second cache. Thus, as mentioned above, the second cache is in an embodiment write-only allocated such that in response to a miss in the second cache on a request to write data to the second cache a cache line of the second cache is allocated for the data such that the data can then be written to the second cache (e.g. in the manner described above), but in response to a miss in the second cache on a request to read data from the second cache to the first cache a cache line of the second cache is not allocated and the read request is passed to the memory system. That is, a cache line in the second cache is in an embodiment only allocated in response to a cache miss on a write request.

Thus, a cache miss on a read request will not attempt to allocate a cache line in the second cache. For instance, when handling read requests from the first cache, the cache controller first checks whether the data is of a data type that is to be handled by the second cache. If the data is a data type that is being handled by the second cache, a cache look up is then performed in response to a read request for that data. If the data is available in the second cache (a cache hit), it can then be read out accordingly (thus saving external read bandwidth for hits in the cache).

However, in this case, if the cache lookup made in response to the read request misses in the second cache, a cache line is not then allocated for the data, and instead the read request is passed to the memory system and the requested data is read from the memory system (without being stored in the second cache) (i.e. the requested data is fetched from its associated data store in the memory system without the data being added into the second cache).

(In contrast to the operation of the second cache, the first cache is in an embodiment both read and write allocated. That is, the cache lines of the first cache are in an embodiment able to be allocated for data on both read and write requests. The first cache is in an embodiment used to cache any (and all) suitable data traffic to/from the graphics processing unit (processor).)

The type of data that is to be processed using the second cache can be (pre)determined, e.g. depending on the size of the second cache. Accordingly a cache controller is provided that is operable to check a data type of data that is being written to/read from the second cache in order to determine whether the data is of a data type that should be processed using the second cache.

A mechanism is thus in an embodiment provided to allow the cache controller to identify a data type of any data that is being written to/read from the second cache. For example, in embodiments, control of the second cache may be achieved using page based hardware attributes, or other similar mechanisms. Using page based hardware attributes, buffers can then be allocated and assigned some marker to the page tables to indicate which type(s) of data traffic a buffer will contain. Simple classification may be to discern, e.g., geometry buffer traffic (e.g. transformed position and attribute data, tile-lists, etc.) and frame buffer traffic (e.g. colour/depth buffer writes, as well as texture reads, etc.). However other arrangements would of course be possible. For example, rather than using page based hardware attributes, a set of bits of the physical memory address for data can be used to indicate a data type. Alternatively, the data type may be sent to the cache controller, e.g. as side band information along, e.g. a dedicated metadata channel, with the metadata indicating the data master type (e.g. "texture read", "frame buffer write", "attribute buffer read/write", "tile read/write", etc.).

Depending on the type of data, the cache controller can then cause the data to either be processed using the second cache (with a cache line being allocated on a write request, etc., in the manner described above), or the second cache can be effectively bypassed with the data being written to/read from the memory system without the data being stored in the second cache.

The technology described herein can be used for any form of output that a graphics processing system (tile-based, or otherwise) may be used to generate. In an embodiment it is used when a graphics processing system is being used to generate images for display, but it can be used for any other form of graphics processing output that a graphics processing system may produce, as desired.

As will be appreciated from the above, the technology described herein is in an embodiment implemented in a system comprising a memory system, a cache system, and a graphics processing unit (GPU) (a graphics processor). Data for a render output (e.g. image to be displayed) is in an embodiment stored in a memory of the memory system. The GPU is in an embodiment arranged to fetch required data from the memory and to store it in the cache system, in the manner described above. The GPU then in an embodiment reads required data from the cache system for generating the render output (e.g. in the manner described above). The render output, once generated in this way, is then in an embodiment displayed, e.g. on a display such as a screen or the like.

The graphics processing unit (graphics processor) will, and in an embodiment does, implement and execute a graphics processing pipeline to perform graphics processing.

In an embodiment, the graphics processing system includes a host processor that executes applications that can require graphics processing by the graphics processing unit (processor). The system in an embodiment further includes appropriate storage (e.g. memory), caches, etc., as described above.

The technology described herein can be used in and with any suitable and desired graphics processing system and processor.

The technology described herein is particularly suitable for use with tiled renderers (tile-based graphics processing systems). Thus, in an embodiment, the graphics processor (processing pipeline) is a tiled-based graphics processor (processing pipeline).

The graphics processing unit (processor) (processing pipeline) can include, and in an embodiment does include, any one or more, and in an embodiment all, of the processing stages that a graphics processor (processing pipeline) can normally include. Thus, for example, the graphics processing unit (processor) in an embodiment includes a primitive setup stage, a rasteriser and a renderer. In an embodiment the renderer is in the form of or includes a programmable fragment shader (a shader core).

The graphics processor (processing pipeline) in an embodiment also comprises one or more programmable shading stages, such as one or more of, and in an embodiment all of, a vertex shading stage, a hull shader, a tessellation stage (e.g. where tessellation is performed by executing a shader program), a domain (evaluation) shading stage (shader), a geometry shading stage (shader), and a fragment shader.

The graphics processor (processing pipeline) may also contain any other suitable and desired processing stages that a graphics processing pipeline may contain such as a depth (or depth and stencil) tester(s), a blender, a tile buffer or buffers, a write out unit etc..

The graphics processing system and/or processor in an embodiment also comprises, and/or is in communication with, one or more memories and/or memory devices that store the data described herein, and/or that store software for performing the processes described herein. The graphics processing system and/or processor may also be in communication with a host microprocessor, and/or with a display for displaying images based on the data generated by the graphics processor (processing pipeline).

In an embodiment, the various functions of the technology described herein are carried out on a single graphics processing platform that generates and outputs the rendered fragment data that is, e.g., written to the frame buffer for the display device.

The technology described herein can be implemented in any suitable system, such as a suitably configured microprocessor based system. In some embodiments, the technology described herein is implemented in computer and/or micro-processor based system.

The various functions of the technology described herein can be carried out in any desired and suitable manner. For example, the functions of the technology described herein can be implemented in hardware or software, as desired. Thus, for example, the various functional elements and stages of the technology described herein may comprise a suitable processor or processors, controller or controllers, functional units, circuits/circuitry, processing logic, microprocessor arrangements, etc., that are operable to perform the various functions, etc., such as appropriately dedicated hardware elements (processing circuits/circuitry) and/or programmable hardware elements (processing circuits/circuitry) that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuits/circuitry, etc., if desired.

Furthermore, any one or more or all of the processing stages of the technology described herein may be embodied as processing stage circuits/circuitry, e.g., in the form of one or more fixed-function units (hardware) (processing circuits/circuitry), and/or in the form of programmable processing circuits/circuitry that can be programmed to perform the desired operation. Equally, any one or more of the processing stages and processing stage circuits/circuitry of the technology described herein may be provided as a separate circuit element to any one or more of the other processing stages or processing stage circuits/circuitry, and/or any one or more or all of the processing stages and processing stage circuits/circuitry may be at least partially formed of shared processing circuits/circuitry.

It will also be appreciated by those skilled in the art that all of the described embodiments of the technology described herein can include, as appropriate, any one or more or all of the optional features described herein.

The methods in accordance with the technology described herein may be implemented at least partially using software e.g. computer programs. It will thus be seen that when viewed from further embodiments the technology described herein provides computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processing system may be a microprocessor, a programmable FPGA (Field Programmable Gate Array), etc.

The technology described herein also extends to a computer software carrier comprising such software which when used to operate a graphics processor, renderer or other system comprising a data processor causes in conjunction with said data processor said processor, renderer or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein provides computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions fixed on a tangible, non-transitory medium, such as a computer readable medium, for example, diskette, CD ROM, ROM, RAM, flash memory, or hard disk. It could also comprise a series of computer readable instructions transmittable to a computer system, via a modem or other interface device, over a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, preloaded with a computer system, for example, on a system ROM or fixed disk, or distributed from a server or electronic bulletin board over a network, for example, the Internet or World Wide Web.

The present embodiments relate to graphics processing systems that use so-called "tile-based" rendering. In tile-based rendering, the two-dimensional scene to be displayed is sub-divided or partitioned into a plurality of smaller sub-regions, that will be referred to herein as "tiles". The tiles are each rendered separately (typically one-after-another) and the rendered tiles are then recombined to provide the complete frame for display. In such arrangements, the scene is typically divided into regularly-sized and shaped sub-regions (tiles) (they are usually e.g., squares or rectangles) but this is not essential.

In a tile-based rendering system, in a first processing pass a list of primitives (i.e. a "tile-list") to be rendered for each tile is thus prepared identifying (e.g. by reference to a primitive indicator) those primitives that are actually present in, and need to rendered for, a given tile. The process of preparing tile-lists for a tile typically involves determining (at a desired level of accuracy) the primitives that intersect (i.e. that will appear (at least in part) within) the tile in question, and then preparing a list of those primitives for future use by the graphics processing system.

The process of determining the primitives that should be listed (rendered) for any given tile can be carried out at varying levels of precision, for example depending on efficiency optimisations for different parts of the tiling and rendering processes. For example, at the most precise level, it could be determined exactly which tiles a given primitive will appear at least in part in, and the primitive then included in the tile-lists for those tiles only. This is commonly referred to as "exact" binning.

FIG. 1 illustrates an exact binning process. As shown in FIG. 1, the scene 1 to be displayed is divided into sixteen regularly sized sub-regions or tiles 2. It is then determined for each primitive in the scene, which tile or tiles the primitive actually appears (falls) within. The primitive is added to the tile-list for each tile that it is found to fall within. Thus, taking the example shown in FIG. 1, the primitive 3 is added to the tile-list for tile 4, the primitive 5 is included in the tile-list for tiles 6 and 7, the primitive 8 is included in the tile-lists for tiles 9, 10, 11 and 12, and the primitive 13 is included in the tile-list for tile 12. (It should be noted here that FIG. 1 shows only a few tiles and primitives for clarity purposes. As will be appreciated by those skilled in the art, in an actual graphics processing operation, there will typically be many more primitives and tiles.)

It is also known to prepare tile-lists with a lower precision than is achieved with exact binning. This can be useful to, e.g., simplify the preparation of the tile-lists. One common "less precise" binning technique is "bounding box" binning. In this case, a so-called "bounding box" is drawn around a primitive or a set of primitives, and then the tiles covered by the bounding box are determined. The primitive or primitives that the bounding box represents (i.e. that are encompassed by the bounding box) are then listed (binned) for each tile that the bounding box has been found to cover (at least in part).

This arrangement thus uses a bounding box to determine the tiles for which a given primitive should be listed to be rendered, rather than the primitive itself. This can mean, e.g., that a primitive may be listed for rendering for a tile that it does not actually fall within (e.g. if the bounding box does not sufficiently tightly or precisely surround the primitive), but on the other hand, the use of bounding boxes in this manner can simplify the preparation of the tile-lists.

Where a primitive falls into more than one tile, it is included in the list (bin) for each tile that it falls within. These tile-lists may be prepared for each tile individually (so that there is a one-to-one correspondence between the tiles and tile-lists). However, it will be appreciated that in some cases, or for at least some of the tiles, a tile-list may cover a set of plural tiles.

Once lists of primitives to be rendered (tile-lists) have been prepared for each sub-region (tile) in this way, the tile-lists are stored for use, e.g., to allow the system to identify which primitives need to be considered (and rendered) when the tile in question is rendered.

Such tile-based rendering arrangements have been found to work well, as they can, for example, help to avoid primitives still being processed for regions of the scene where they are not present.

Figure 2:
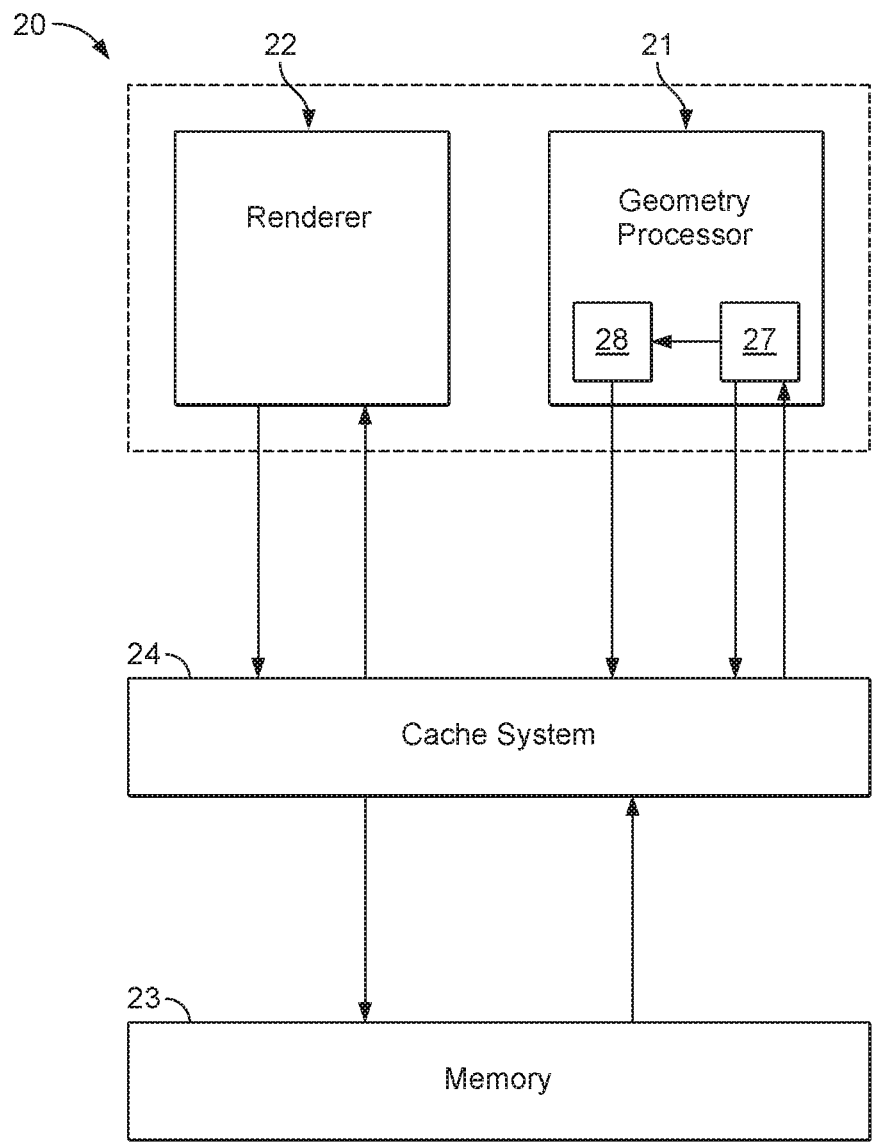
FIG. 2 shows schematically an arrangement of a graphics processor that can operate in accordance with the technology described herein.

FIG. 2 shows schematically a graphics processor 20 that may be operated in accordance with the technology described herein. The graphics processor 20 includes a geometry processor 21 and a renderer 22, and has access to a memory 23. The memory 23 may be "on-chip" with the geometry processor 21 and renderer 22, or may be an external memory that can be accessed by the geometry processor 21 and renderer 22. As shown in FIG. 2, the graphics processor 20 interfaces with the memory 23 via a cache system 24, the operation of which will be explained in further detail below.

The memory 23 stores, inter alia, and as shown in FIG. 2, a set of raw geometry data (which is, for example, provided by the graphics processor driver or an API running on a host system (microprocessor) of the graphics processor 20) which is provided as input to the geometry processor 21 for processing during an initial processing pass.

For instance, the geometry processor 21 may comprise, inter alia, a programmable vertex shader 27, and a tile-list building unit 28. The programmable vertex shader 27 takes as it input the raw geometry data stored in the memory 23, and processes that data to provide transformed geometry data (which is the result of various transformation and processing operations carried out on the raw geometry) comprising the geometry data in a form that is ready for two-dimensional ('2D') placement in the frame to be displayed. The transformed geometry data comprises, for example, transformed vertices (vertex data), etc.. The programmable vertex shader 27 and the processes it carries out can take any suitable form and be any suitable and desired such processes.

The tile-list building unit 28 carries out the process of preparing the tile-lists by allocating the primitives to the tile-lists which are then used by the renderer 22 to identify the primitives that should be rendered for each tile of the scene to be rendered. To do this, the tile-list building unit 28 takes as its input the transformed and processed vertex data from the programmable vertex shader 27 (i.e. the positions of the graphics object in the scene), builds tile-lists using that data, and stores those lists as the tile-lists.

The transformed geometry data and tile-lists generated by the geometry processor 21 during the first processing pass are then written back to the memory 23 so that this data can be subsequently fetched into and used by the renderer 22 in order to generate the render output (e.g. frame for display).

According to the embodiments of the technology described herein, and as shown in FIG. 2, this data is stored in the cache system 24.

To generate a render output, the renderer 22 will, in essence, determine which of the primitives should be rendered for a given tile, and then render and store data for that tile (e.g. in a frame buffer) so that the image of the primitive can be properly displayed, e.g. on a display device.

Figure 3:
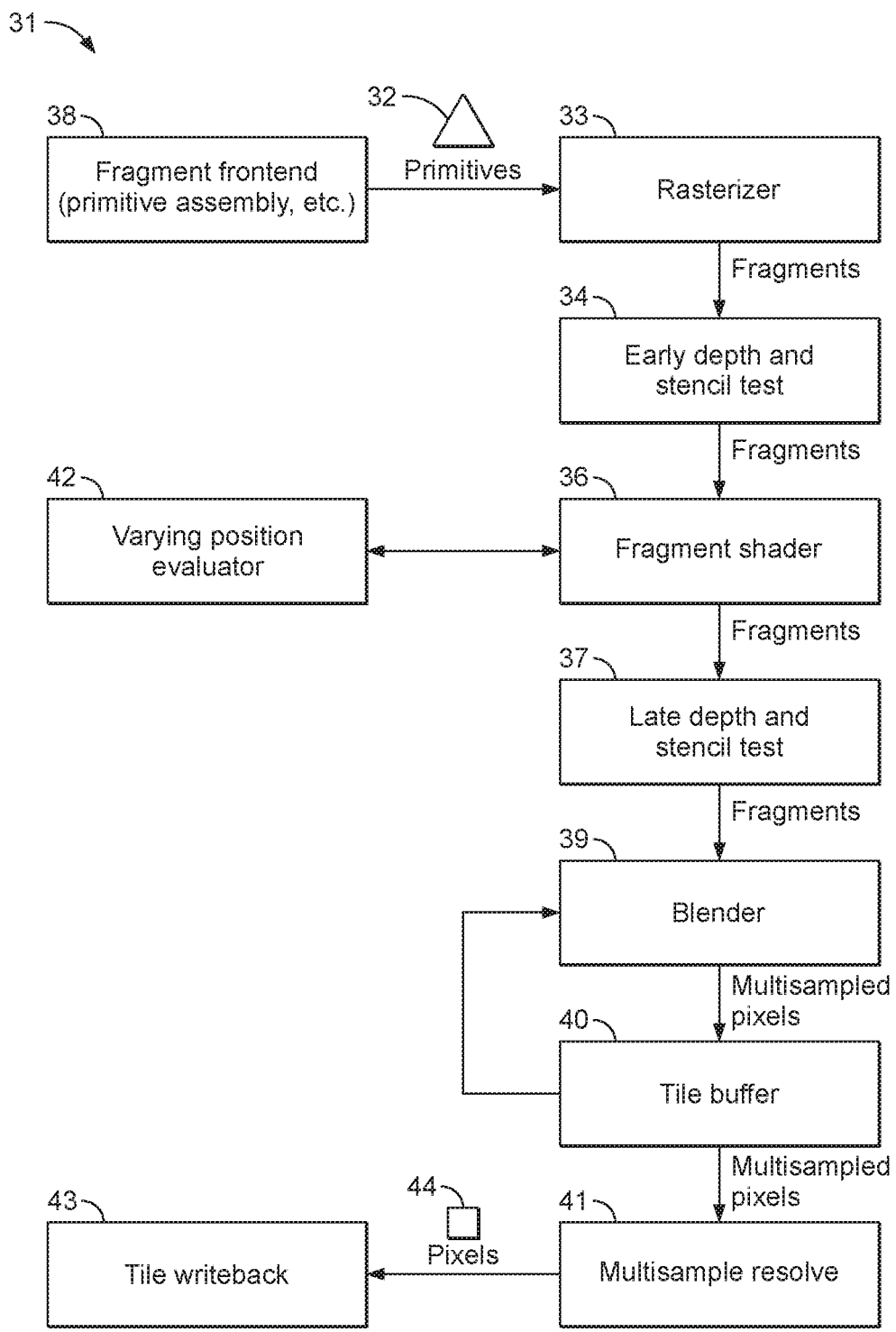
FIG. 3 shows in more detail an example of a graphics processing pipeline.

The processing of the primitives will now be described with reference to FIG. 3 which shows schematically a graphics processing (rendering) pipeline 31 that may operate in accordance with the technology described herein. The graphics processing pipeline 31 shown in FIG. 3 is a tile-based renderer and thus will produce tiles of a render output data array, such as an output frame to be generated. The render output data array may typically be an output frame intended for display on a display device, such as a screen or printer, but may also, for example, comprise intermediate data intended for use in later rendering passes (also known as a "render to texture" output), etc.. Other arrangements for the graphics processing pipeline would, of course, be possible.

FIG. 3 shows the main elements and pipeline stages of the graphics processing pipeline 31. However, as will be appreciated by those skilled in the art there may be other elements of the graphics processing pipeline that are not illustrated in FIG. 3. It should also be noted here that FIG. 3 is only schematic, and that, for example, in practice the shown functional units and pipeline stages may share significant hardware circuits, even though they are shown schematically as separate stages in FIG. 3. It will also be appreciated that each of the stages, elements and units, etc., of the graphics processing pipeline as shown in FIG. 3 may be implemented as desired and will accordingly comprise, e.g., appropriate circuits/circuitry and/or processing logic, etc., for performing the necessary operation and functions.

FIG. 3 shows schematically the pipeline stages after the graphics primitives (polygons) 32 for input to the rasterisation process have been generated. Thus, at this point the graphics data (the vertex data) has undergone fragment frontend operations 38, such as transformation and lighting operations (e.g. as part of the geometry processing shown in FIG. 2), and a primitive set-up stage to set-up the primitives to be rendered, in response to the commands and vertex data provided to the graphics processor.

As shown in FIG. 3, this part of the graphics processing pipeline 31 in an embodiment includes a number of stages, including a rasterisation stage 33, an early Z (depth) and stencil test stage 34, a fragment shading stage 36, a late Z (depth) and stencil test stage 37, a blending stage 39, tile buffers 40 and a downsampling and writeback (multisample resolve) stage 41.

The rasterisation stage 33 of the graphics processing pipeline 31 operates to rasterise the primitives making up the render output (e.g. the image to be displayed) into individual graphics fragments for processing. To do this, the rasteriser 33 receives graphics primitives 32 for rendering, rasterises the primitives to sampling points and generates graphics fragments having appropriate positions (representing appropriate sampling positions) for rendering the primitives.

The early Z/stencil stage 34 performs a Z (depth) test on fragments it receives from the rasteriser 33, to see if any fragments can be discarded (culled) at this stage. To do this, it compares the depth values of (associated with) fragments issuing from the rasteriser 33 with the depth values of fragments that have already been rendered (these depth values are stored in a depth (Z) buffer that is part of the tile buffers 40) to determine whether the new fragments will be occluded by fragments that have already been rendered (or not). At the same time, an early stencil test is carried out. The early depth and stencil testing stage 34 may be configured to be able to perform a single depth and stencil test per clock cycle.

Fragments that pass the fragment early Z and stencil test stage 34 are then sent to the fragment shading stage 36. The fragment shading stage 36 performs the appropriate fragment processing operations on the fragments that pass the early Z and stencil tests, so as to process the fragments to generate the appropriate fragment data, etc., for the render output (e.g. for display of the fragments).

This fragment processing may include any suitable and desired fragment shading processes, such as executing fragment shader programs on the fragments, applying textures to the fragments, applying fogging or other operations to the fragments, etc., to generate the appropriate fragment data. In the present embodiment, the fragment shading stage 36 is in the form of a shader pipeline (a programmable fragment shader), but other arrangements, such as the use also or instead of fixed function fragment shading units would be possible, if desired. The fragment shader 36 is configured to always process all the sampling points associated with a fragment that it receives as a whole.

The fragment shading stage 36 has associated with it a varying interpolator (a varying position evaluator) 42 which is used to determine the correct varying value for the current fragment. For certain interpolation modes, such as centroid mapping, the varying interpolator uses the fragment's associated coverage mask to select the correct position within the fragment to interpolate the varying data for. Thus, the varying interpolator 42 is configured to be able to process all the sampling points associated with a fragment that it receives in parallel, so as to be able to select the correct interpolation position for centroid mapping.

There is then a "late" fragment Z and stencil test stage 37, which carries out, inter alia, an end of pipeline depth test on the shaded fragments to determine whether a rendered fragment will actually be seen in the final image. This depth test uses the Z-buffer value for the fragment's position stored in the Z-buffer in the tile buffers 40 to determine whether the fragment data for the new fragments should replace the fragment data of the fragments that have already been rendered, by comparing the depth values of (associated with) fragments issuing from the fragment shading stage 36 with the depth values of fragments that have already been rendered (stored in the depth buffer). This late fragment depth and stencil test stage 37 also carries out any necessary "late" alpha and/or stencil tests on the fragments.

The fragments that pass the late fragment test stage 37 may then be subjected to, as required, any necessary blending operations with fragments already stored in the tile buffers 40 in the blender 39. Any other remaining operations necessary on the fragments, such as dither, etc. (not shown) may also be carried out at this stage.

Finally, the (blended) output fragment data (values) are written to the tile buffers 40 from where they can, for example, be output to a frame buffer for display. The depth value for an output fragment is also written appropriately to a Z-buffer within the tile buffers 40. The tile buffers and Z-buffer will thus store appropriate colours, etc., or Z-values for the sampling points that the buffers represent. The tile buffers store an array of sample data that represents part of the render output (e.g. image to be displayed). A plurality of tile buffers may be provided. For instance, in embodiments, three tile buffers may be provided with two of the three tile buffers are used to store colour (red, green, blue) values for each sampling point (it would be possible to use one tile buffer for this purpose, but in an embodiment there are two), and one tile buffer is used to store Z (depth) values and stencil values for each sampling point. Other arrangements would, of course, be possible. These tile buffers may be provided as separate buffers, or may in fact all be part of the same, larger buffer. They are located on (local to) the graphics processing pipeline (chip).

The data from the tile buffers 40 is then input to a downsampling (multisample resolve) unit 41, and thence output (written back) to an output buffer 43 (tile writeback) (that may not be on the graphics processing platform itself), such as a frame buffer of a display device (not shown). The display device could comprise, e.g., a display comprising an array of pixels, such as a computer monitor or a printer.

The downsampling unit 41 downsamples the sample data stored in the tile buffers 40 to the appropriate resolution for the output buffer (device) (i.e. such that an array of pixel data corresponding to the pixels of the output device is generated), to generate output values (pixels) 44 for output to the output buffer 43. This downsampling can take place in any suitable manner. In the present embodiment linear blending of the data is used to downsample it. However, other arrangements would be possible, if desired. If needed, the downsampling unit 41 may also apply appropriate gamma correction to the data that it outputs to the output buffer 43, or this may be done, e.g., as a fragment shading operation, or in any other suitable and desired manner.

Once a tile of the render output has been processed and its data exported to a main memory (e.g. to a frame buffer in a main memory (not shown)) for storage, the next tile is then processed, and so on, until sufficient tiles have been processed to generate the entire render output (e.g. frame (image) to be displayed) which can then be written into a frame buffer.

Figure 4:
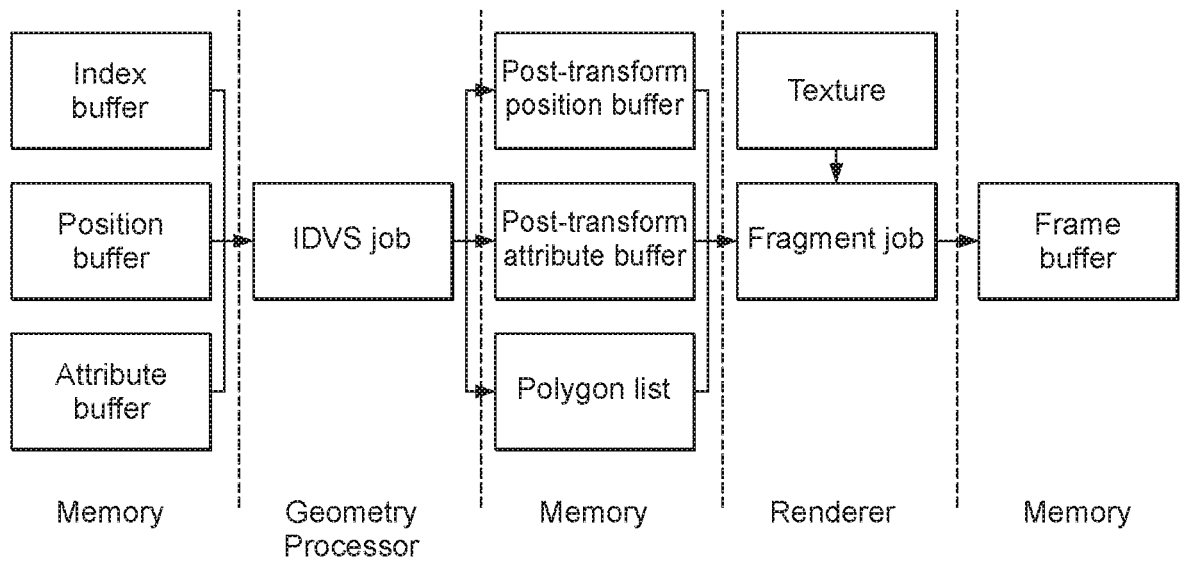
FIG. 4 illustrates various data structures that may be used when rendering an output in a tile-based graphics processing arrangement.

FIG. 4 illustrates the various data structures (buffers) that may be used within a tile-based rendering process as described above into which data may be alternately written/read out from during a graphics processing operation. For instance, as shown, a vertex shading (IDVS) job in the geometry processor 21 typically receives as input (raw) geometry data from an index buffer, a position buffer and an attribute buffer typically stored in memory 23 (although this data is typically pre-fetched and provided to the geometry processor 21 via the cache system 24). This data is then processed (e.g. by the vertex shading operations in the geometry processor 21) to generate transformed position and attribute data that is written into associated post-transform position and post-transform attribute buffers. The geometry processing also generates the tile-lists. This information is then written back from the geometry processor 21 via the cache system 24. The geometry data is then provided as input to the renderer 22, along with texture data, and processed (e.g. as shown in FIG. 3) to generate the render output which is then written into a frame buffer, e.g. for display.

It will be appreciated that the transformed geometry data, and tile-lists, are purely intermediate data that relate only to the current processing job. That is, the geometry data is then used by the connected fragment processing job, but does not need to be used again after the connected fragment processing job is complete. Similarly, the frame buffer once generated may be provided as texture input for the next render pass, but the frame buffer may not need to persist beyond this.

In some arrangements, an L2 cache may be provided that is operable to cache any and all data (including both read and write data) that is to be transferred between the graphics processor 20 and the memory 23. However, it has been found that this may not be the most efficient use of cache resource. The technology described herein therefore provides a novel cache arrangement that is able to more efficiently cache at least some such intermediate data types generated in a tile-based graphics processing system.

In particular, there is provided a cache system having (at least) a first cache that is configured to transfer data to and from the graphics processor 20 and a second cache that is arranged and configured to transfer data between the first cache and the memory 23. For instance, in the present embodiments, as shown in FIG. 5, the cache system 24 comprises a "first" cache of the cache system 24 in the form of an L2 cache 52 (or more precisely a set of L2 caches), and a "second" cache of the cache system 24 in the form of an L3 cache 54 arranged between the L2 cache(s) 52 and memory 23.

Figure 5:
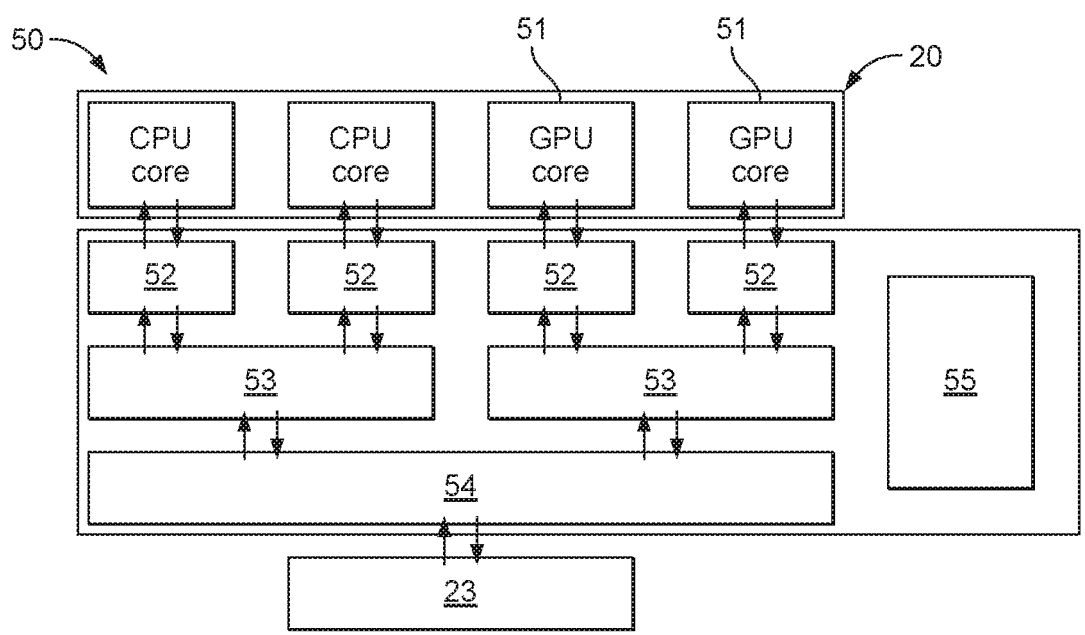
FIG. 5 shows an example of a cache system according to an embodiment of the technology described herein.

Thus, FIG. 5 shows an example of a memory hierarchy according to an embodiment. As shown in FIG. 5, the cache system 24 that is provided between the external (e.g. DRAM) memory 23 and the graphics processor 20 includes three cache levels. In particular, the cache system 24 includes a first cache of the cache system in the form of a set of local L2 caches 53 (for both the graphics processor 20 and the CPU 50), a second cache of the cache system in the form of a shared (system) L3 cache 54 that is disposed between the L2 cache 53 and the external memory 23, as well as a set of local L1 caches 52 that interface with the processing cores 51 of the graphics processor 20 (and a corresponding set of L1 caches interfacing with the processing cores of the CPU 50). However, various other arrangements would of course be possible. For example, although FIG. 5 shows the L3 cache 54 as being shared between the graphics processor 20 and the CPU 50 of the data processing system of which the graphics processor 20 is part of, it will be appreciated that this need not necessarily be the case and in embodiments a local L3 cache may be provided that is dedicated for the GPU.

A cache controller 55 is also provided that is operable to determine the type of data that is being passed to the cache system and to decide whether or not that data should be processed by the second, L3 cache 54, in the manner set out below.

In particular, the cache system is configured such that only certain (selected) types of data are cached using the L3 cache 54. For example, the cache system 24 is generally configured to make more efficient use of the second, L3 cache 54. So, the L3 cache 54 is configured to cache (only) data types that it is expected can be efficiently cached in the L3 cache 54. This will typically depend on the size of the L3 cache 54 compared to the expected size of the data that is to be written to the memory 23 (via the cache system 24).

For example, the Applicants have found that it is most beneficial for small to medium-sized L3 caches (e.g. about 2-4 MB) to only cache geometry bandwidth (e.g. post-transform position and attributes as well as polygon list and pointer table). For instance, for these sizes the typical frame buffer bandwidth is expected to be too large to fit into the L3 cache 54, and attempting to cache frame buffer data would therefore result in the data flows trashing each other, leading to poor cache performance. In this case, just caching geometry data may lead to the highest read hit-rates.

On the other hand, for medium to large-sized caches (e.g. about 8-16 MB) caching all writes (including geometry and frame buffer bandwidth) may be the best option.

The cache controller 55 is thus operable, when data is to be written to memory 23 via the cache system 24, to check whether the data is of a data type that should be cached using the second, L3 cache 54, and then to proceed accordingly either by caching that data in the L3 cache 54, or by instead bypassing the L3 cache 54 and going straight from the L2 cache 52 to memory 23. This may be implemented in various suitable ways. For example, this control may be achieved using page based hardware attributes, or other similar mechanisms. However other arrangements would of course be possible. For example, rather than using page based hardware attributes, a set of bits of the physical memory address for data can be used to indicate a data type. Alternatively, the data type may be sent to the cache controller, e.g. as side band information along a dedicated metadata channel (not shown).

Figure 6:
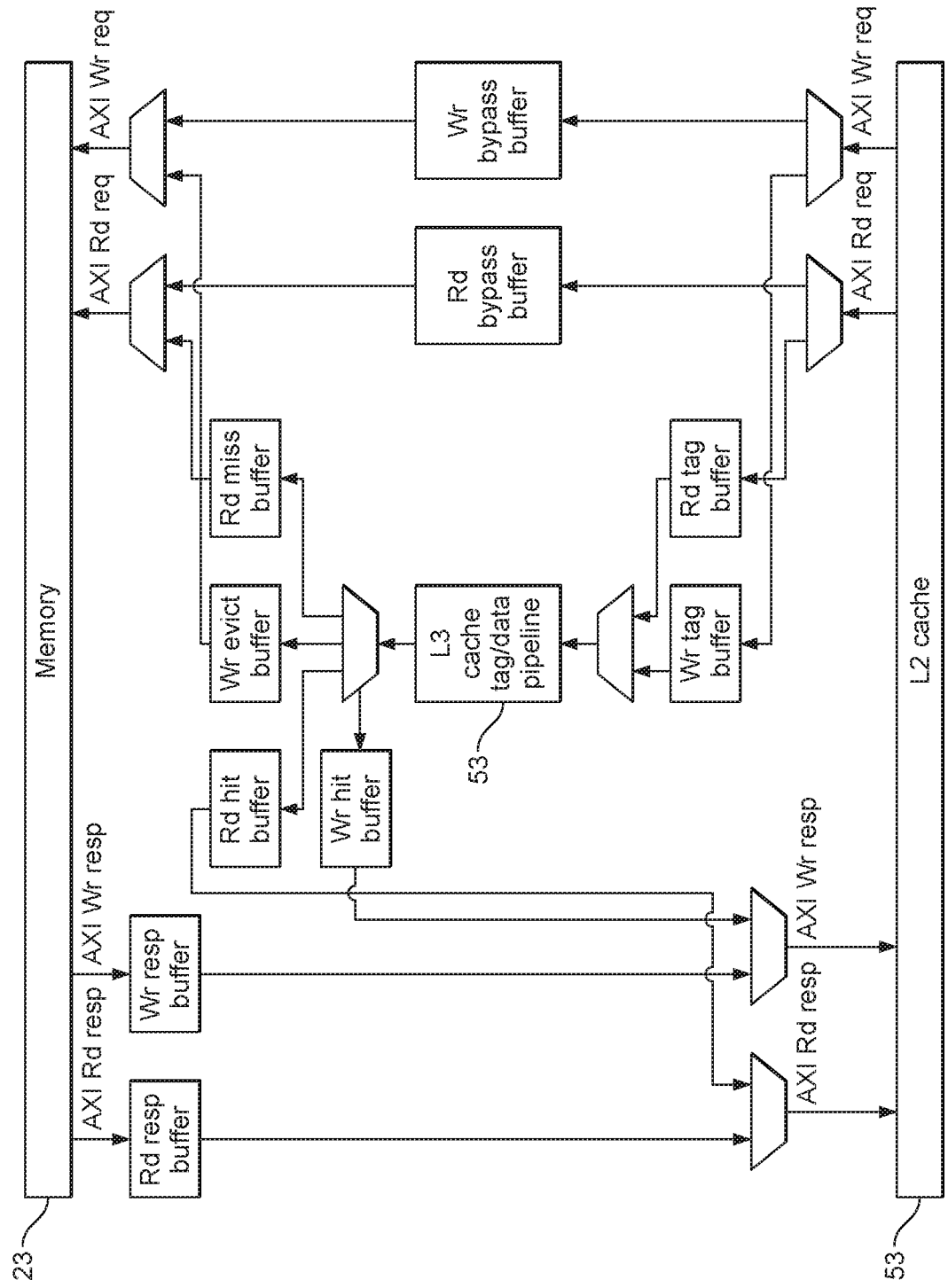
FIG. 6 illustrates the data flows using a cache system according to an embodiment of the technology described herein.

FIG. 6 shows the data flows for different types of data traffic illustrating how read and write requests are processed in dependence of the type of data that is to be read/written. In particular, FIG. 6 shows the data flows for both read and write requests may alternately either be processed using the L3 cache 54 (i.e. if the cache controller 55 determines that the data is of a data type (e.g. geometry and/or optionally frame buffer data) that is to be cached in the L3 cache 54) or instead passed straight to memory 23 without storing the data in the L3 cache 54.

For instance, as shown in FIG. 6, in the case of a write request issued from the (first) L2 cache 53 to the (second) L3 cache 54 ('AXI Wr Req'), it is first checked whether the data that is to be written is of a data type that should be cached using the L3 cache 54. If not, the request is passed to memory 23 (via a suitable bypass buffer ('Wr Bypass Buffer')) and the data is not stored in the L3 cache 54 but is instead written into memory 23. On the other hand, if the data is of a data type that should be cached using the L3 cache 54, a cache lookup is then performed for that data using its associated tag ('Wr Tag Buffer'), and in the event of a cache hit ('Wr Hit Buffer'), the cache entry for that data is then updated (overwritten) with the new data, and a write response returned to the L2 cache 53 ('AXI Wr Resp').

In the case of a cache miss on a write request (i.e. an entry for the data is not present in the L3 cache 54), a cache line of the L3 cache 54 is then allocated for the data, and the data written into the L3 cache 54 in the usual fashion (and if the L3 cache 54 is full, a cache line of the L3 cache 54 may then be selected for eviction, e.g. based on a least-recently-used, or any other suitable, policy, with the data in the evicted cache line then being written back to memory 23 to free up that cache line to be allocated for the new data that is to be written ('Wr Evict Buffer')).

Figure 7:
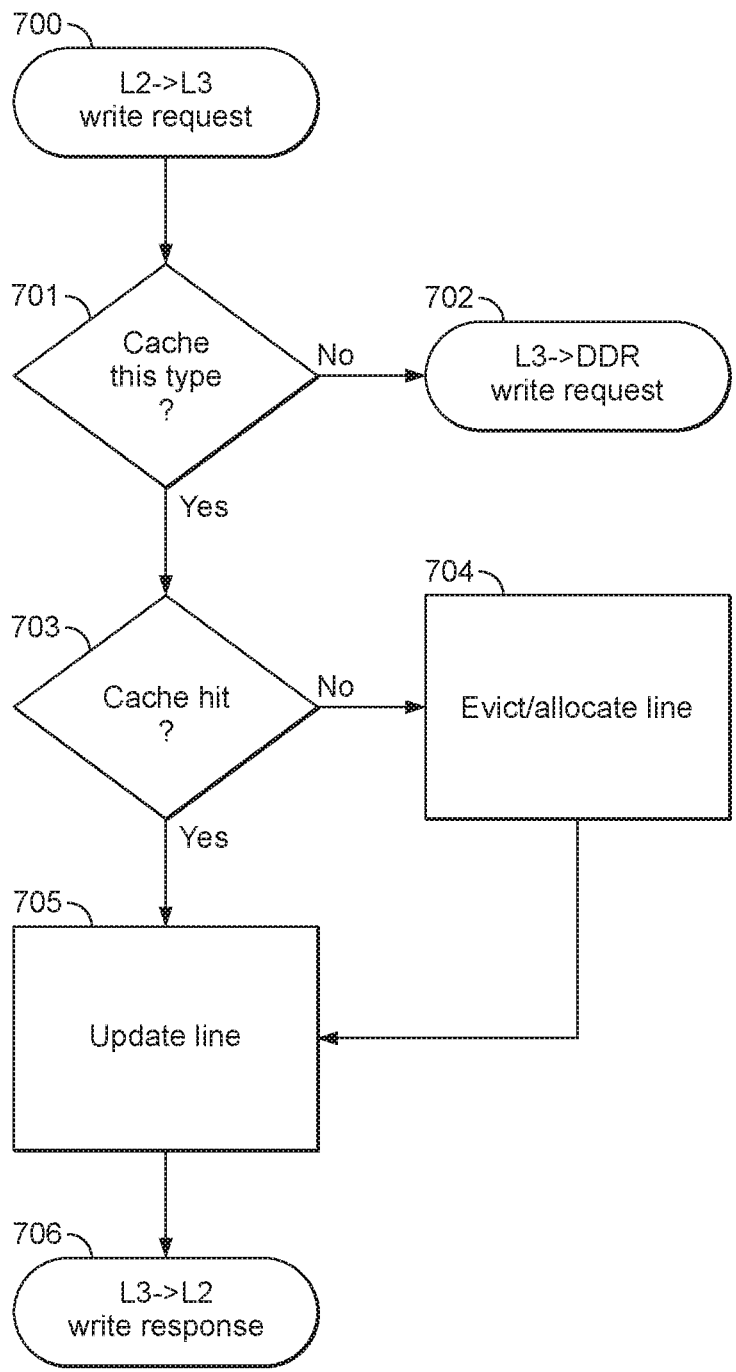
FIG. 7 is a flowchart illustrating how a request to write to memory is handled using a cache system according to an embodiment.

FIG. 7 is a flowchart showing in more detail how a request (700) to write data from the L2 cache 53 to memory is processed using the L3 cache 54 in an embodiment. First, the cache controller 55 checks whether the data is of a data type that is to be cached using the L3 cache 54 (701). If the data is not to be cached using the L3 cache 54 (701—No), the write request is then passed straight to the external memory 23 (702), without storing the data in the L3 cache 54.

However, if the data is of a data type that should be cached using the L3 cache 54 (701—Yes), a cache lookup for that data in the L3 cache 54 is then performed (703). If an entry for the data is not present (703—No), a cache line in the L3 cache 54 is then allocated for that data (704) (with a cache line being evicted, as necessary, e.g. if the L3 cache 54 is full). The allocated cache line is then updated (705) and the data written into that cache line. If there is a cache hit, such that an entry for the data is already present in the L3 cache (703—Yes), a new cache line need not be allocated, and instead the existing cache line is simply updated (overwritten) with the new data (705). When the cache line has been updated (705), a write response is then returned from the L3 cache 54 to the L2 cache 53 (706).

In an embodiment the L3 cache 54 is write-only allocated. That is, in an embodiment a cache line in the L3 cache 54 is only ever allocated in response to a write request. Thus, as shown in FIG. 6, a read request is handled differently to a write request. Again, the cache controller 55 initially checks whether the data that is to be read is of a data type that is to be cached in the L3 cache 54. If not, the read request is simply passed to the memory 23 (via 'Rd Bypass Buffer'), and the requested data can then be written back from the memory 23 without being stored in the L3 cache 54 ('AXI Rd Resp' via 'Rd Resp Buffer').

On the other hand, when the data is of a data type that is to be cached in the L3 cache 54, a cache lookup is then made for that data ('Rd Tag Buffer'). In the event of a cache hit ('Rd Hit Buffer'), that data can then be read out from the L3 cache 54 in the usual fashion. However in the event of a cache miss (Rd Miss Buffer'), rather than allocating a cache line in the L3 cache 54 for the data, the read request is simply passed to memory 23, and the data is then read out from memory 23 without being stored in the L3 cache 54.

Figure 8:
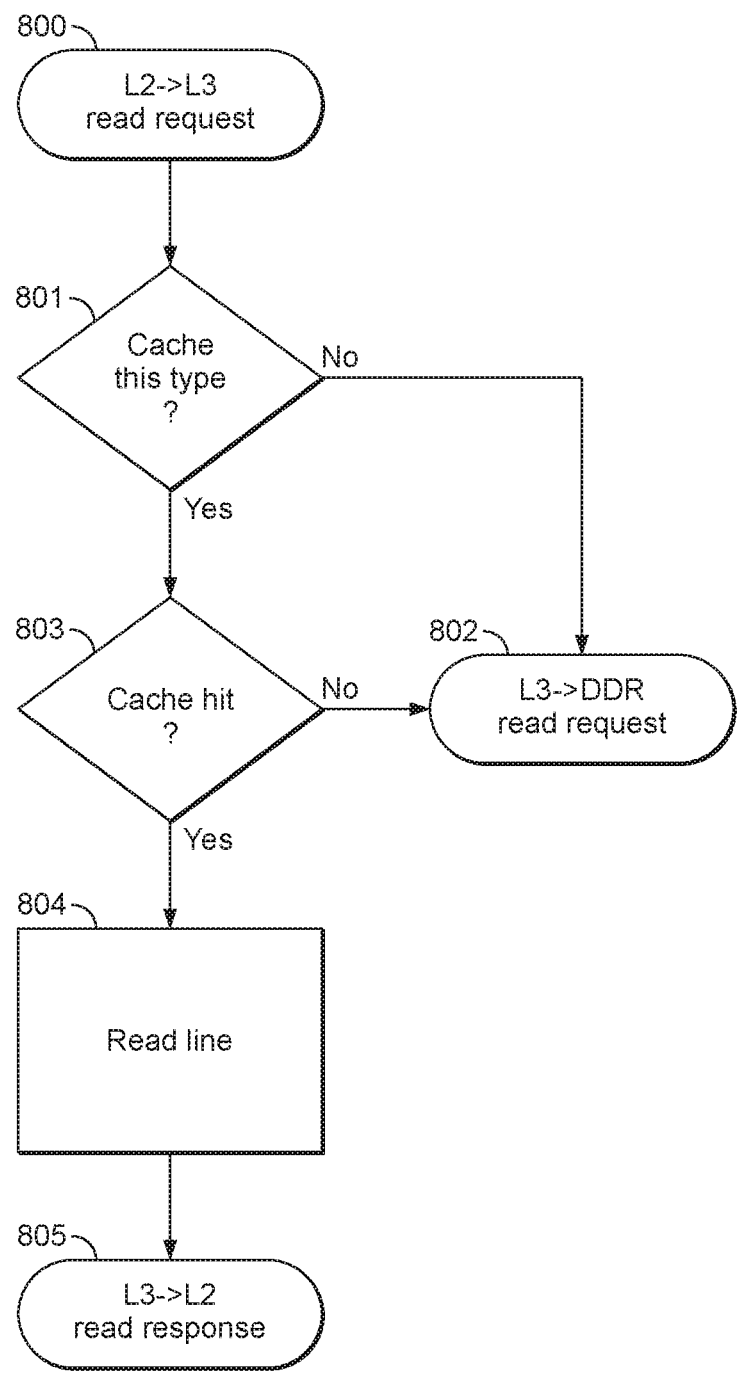
FIG. 8 is a flowchart illustrating how a request to read from memory is handled using a cache system according to an embodiment.

FIG. 8 is a flowchart showing how a request (800) to read data from memory 23 is processed using the L3 cache 54. In the first step (801), the cache controller 55 checks whether the data is of a data type that should be cached in the L3 cache 54. If not (801—No), the read request is simply passed down to memory 23 (802) so that the data is fetched and read out from memory 23 without storing the data in the L3 cache 54. That is, if the read request misses in the L3 cache 54, the data is not added into the L3 cache 54. If the data is of a data type that should be cached in the L3 cache 54 (801—Yes), a cache lookup is then performed. If the read request hits in the L3 cache 54 (803—Yes), the data can then be read out from the L3 cache 54 in the usual manner (804), and a read response provided from the L3 cache 54 (805). However, if there is a cache miss on a read request (803—No), the read request is again simply passed down to memory 23 (802), without attempting to allocate a cache line for the data (in contrast to the situation where there is a cache miss on a write request, in which case a cache line is allocated, as shown in FIG. 7).

Figure 9:
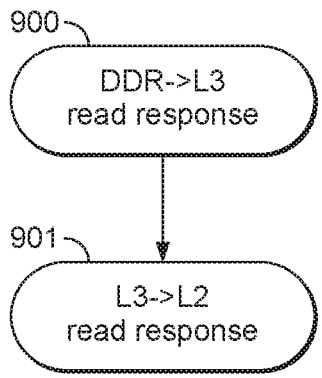
FIG. 9 is a flowchart illustrating a memory read response according to an embodiment.

FIG. 9 is a flowchart showing how a read response (900) may be passed from memory 23 through the L3 cache 54 to the L2 cache 53 (901). For instance, as discussed above, in the event that a request to read data from the L3 cache 54 to the L2 cache 53 misses in the L3 cache 54, the read request is then passed to memory 23 to fetch the data from memory 23 without storing the data in the L3 cache 54. In that case the response to the read request is simply passed back up through the cache system. It is thus invisible to the L2 cache 53 whether the data was fetched from the L3 cache 54 or from memory 23.

Figure 10:
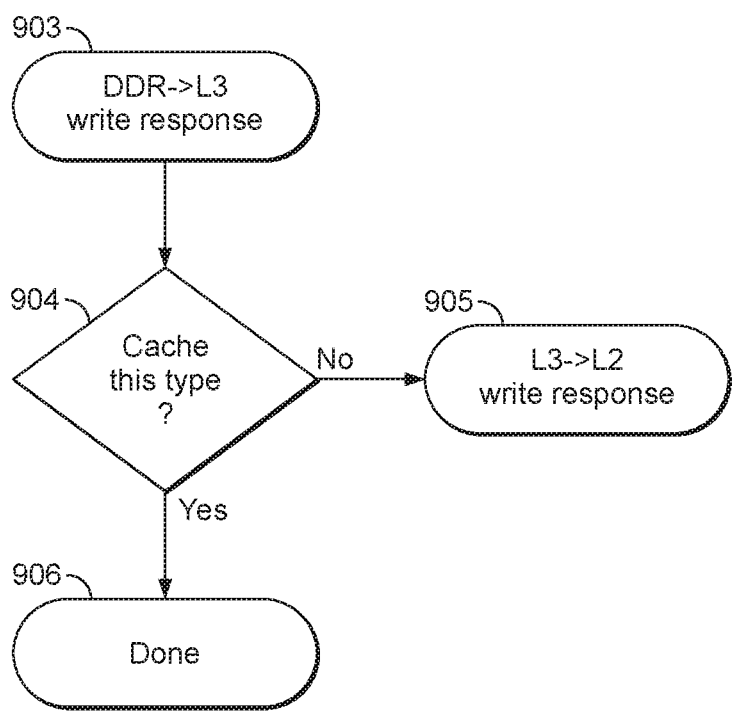
FIG. 10 is a flowchart illustrating a memory write response according to an embodiment.

FIG. 10 is a flowchart showing how a write response may be passed from memory 23 to the L3 cache 54. This may occur either because the data is of a data type that is not cached in the L3 cache 54 (in which case the write request is passed to memory 23, as shown at step 702 in FIG. 7) or because the data has been evicted from the L3 cache 54 (i.e. at step 704 shown in FIG. 7). The cache controller therefore needs to discern between these two situations in order to know whether a write response needs to be returned to the L2 cache 53. For instance, in the first case (904—No), if the data was not processed in the L3 cache 54, and instead the data was written back to memory 23, a write response is then sent to the L2 cache 53 to communicate this (905). On the other hand, in the second case (904—Yes), the data has been written to memory 23 only because the L3 cache 54 is full, and not directly in response to a write request from the L2 cache 53 (that is the data that is written back to memory 23 in this case is not the data that was the subject of the write request that caused the data to be evicted and written back, i.e. the data is written back only to free up a cache entry for the new data). This memory write therefore does not need to be communicated to the L2 cache 53 (and is therefore not—906).

It has been found that a cache system operated in the manner described above, e.g. having a write-only allocated L3 cache 54, is particularly efficient at caching certain (selected) types of intermediate data that is generated in a tile-based graphics processing system, of the type above, including geometry data and potentially also frame buffer data (depending on the size of the L3 cache 54). For instance, in some tests using a 4 MB L3 cache that is configured to cache only geometry data, it has been found that the cache system described above may result in a total read bandwidth reduction of up to about 20% per frame. In tests using an 8 MB L3 cache to cache all data traffic (i.e. geometry and frame buffer data), total read bandwidth reductions of up to 40% have been achieved. There is also slight performance gain due to the improved hit rates in the last level cache. For example, geometry heavy content may put a lot of strain on the fragment frontend (i.e. the geometry processing steps). Hitting in the last level cache for geometry bandwidth is therefore beneficial for the tile-list reader and vertex fetcher units which can provide over pressure for the later pipeline stages, leading to less fragment starvation.

As will be appreciated by those skilled in the art, the present embodiment (and the technology described herein) can be implemented in any (e.g.) tile-based rendering system, as desired. The various components and functions of the present embodiment and the technology described herein can similarly be implemented as desired and using any suitable techniques.

Thus, although the foregoing detailed description has been presented for the purposes of illustration and description, it is not intended to be exhaustive or to limit the technology described herein to the precise form disclosed. Many modifications and variations are possible in the light of the above teaching. The described embodiments were chosen in order to best explain the principles of the technology described herein and its practical applications, to thereby enable others skilled in the art to best utilise the technology described herein, in various embodiments and with various modifications as are suited to the particular use contemplated. It is intended that the scope be defined by the claims appended hereto.

The invention claimed is:

1. A graphics processing system comprising:
a memory system;
a graphics processor; and
a cache system arranged between the memory system and the graphics processor and configured to transfer data between the memory system and the graphics processor for use by the graphics processor when generating a render output;
the cache system comprising:
a cache controller;
a first cache configured to transfer data to and from the graphics processor for use when generating a render output, wherein the first cache is used to cache data that is to be transferred between the graphics processor and the memory system via the cache system, independently of a type of data; and
a second cache arranged and configured to transfer data between the first cache and the memory system, wherein the second cache is used only to cache certain types of data; wherein
the cache controller is configured to, when data is to be written from the first cache to the memory system, determine the data type of the data that is to be written and to, in dependence on the determined data type, either cause the data to be written into the second cache without writing the data to the memory system, or to cause the data to be written to the memory system without storing the data in the second cache.

2. The graphics processing system of claim 1, wherein the second cache is write-only allocated such that in response to a miss in the second cache on a request to write data to the second cache a cache line of the second cache is allocated for the data such that the data can then be written to the second cache, whereas in response to a miss in the second cache on a request to read data from the second cache a cache line of the second cache is not allocated and the read request is passed to the memory system.

3. The graphics processing system of claim 1, wherein the cache controller is configured to cause intermediate geometry data that is generated by the graphics processor when generating a rendering output to be written into the second cache.

4. The graphics processing system of claim 3, wherein the cache controller is configured to cause frame buffer data to be written into the second cache.

5. The graphics processing system of claim 1, wherein the cache controller is configured to invalidate the second cache so that the data in the second cache can be evicted without writing the data to the memory system in response to a set of one or more processing job(s) using the data in the second cache being completed.

6. The graphics processing system of claim 1, wherein when data is to be read from the second cache, the cache controller is configured to determine a data type of the data that is to be read and to, when it is determined that the data is of a data type that is to be cached using the second cache, check whether the data is present in the second cache, and if the data is present in the second cache, to read the data from the second cache, whereas if the data is not present in the second cache, to read the data from the memory system.

7. The graphics processing system of claim 6, wherein when it is determined that the data is of a data type that is not to be cached using the second cache, the cache controller is configured to read the data from the memory system without checking the second cache.

8. A graphics processing system comprising:
a memory system;
a graphics processor; and
a cache system arranged between the memory system and the graphics processor and configured to transfer data between the memory system and the graphics processor for use by the graphics processor when generating a render output;
the cache system comprising:
a first cache operable to transfer data to and from the graphics processor for use when generating a render output, wherein the first cache is both read and write allocated; and
a second cache arranged and configured to transfer data between the first cache and the memory system, wherein the second cache is used only to cache certain types of data, and wherein the second cache is write-only allocated such that in response to a cache miss in the second cache on a write request a cache line of the second cache is allocated for the data such that the data can then be written to the second cache, whereas in response to a miss in the second cache on a read request a cache line of the second cache is not allocated and the read request is passed to the memory system.

9. A method of processing graphics using a graphics processing system comprising:
a memory system;
a graphics processor; and
a cache system arranged between the memory system and the graphics processor and operable to transfer data between the memory system and the graphics processor for use by the graphics processor when generating a render output, the cache system comprising:
a first cache operable to transfer data to and from the graphics processor for use when generating a render output, wherein the first cache is used to cache data that is to be transferred between the graphics processor and the memory system via the cache system, independently of a type of data; and
a second cache arranged and operable to transfer data between the first cache and the memory system, wherein the second cache is used only to cache certain types of data; and
a cache controller,
the method comprising:
when data is to be written from the first cache to the memory system during a graphics processing operation, the cache controller determining data type of the data to be written and, in dependence on the determined data type, either writing the data into the second cache without writing the data to the memory system, or writing the data to the memory system without storing the data in the second cache.

10. The method of claim 9, comprising:
when data is to be written from the first cache to the memory system, issuing a write request for that data to the second cache, and in response to the write request missing in the second cache, allocating a cache line in the second cache for that data; and
when data is to be read from the second cache into the first cache, issuing a read request for that data to the second cache, and in response to the read request missing in the second cache, passing the read request to the memory system without allocating a cache line in the second cache.

11. The method of claim 9, comprising writing intermediate geometry data that is generated by the graphics processor when generating a rendering output into the second cache.

12. The method of claim 11, further comprising writing frame buffer data into the second cache.

13. The method of claim 9, comprising: when a set of one or more processing job(s) using the data in the second cache has completed, invalidating the second cache so that the data in the second cache can be evicted without writing the data to the memory system.

14. The method of claim 9, comprising: when data is to be read from the second cache, determining a data type of the data that is to be read and, when it is determined that the data is of a data type that is to be cached using the second cache, checking whether the data is present in the second cache, and if the data is present in the second cache, reading the data from the second cache, whereas if the data is not present in the second cache, reading the data from the memory system.

15. The method of claim 14, wherein when it is determined that the data is of a data type that is not to be cached using the second cache, reading the data from the memory system without checking the second cache.

16. A method of processing graphics using a graphics processing system comprising:
a memory system;
a graphics processor; and
a cache system arranged between the memory system and the graphics processor and operable to transfer data between the memory system and the graphics processor for use by the graphics processor when generating a render output,
the cache system comprising:
a first cache operable to transfer data to and from the graphics processor for use when generating a render output, wherein the first cache is both read and write allocated; and
a second cache arranged and operable to transfer data between the first cache and the memory system, wherein the second cache is write-only allocated and is used only to cache certain types of data,
the method comprising:
when data is to be written from the first cache to the memory system, issuing a write request for that data to the second cache, and in response to the write request missing in the second cache, allocating a cache line in the second cache for that data; and
when data is to be read from the second cache into the first cache, issuing a read request for that data to the second cache, and in response to the read request missing in the second cache, passing the read request to the memory system without allocating a cache line in the second cache.

17. A non-transitory computer readable storage medium storing software code that when executed on a data processor performs a method of processing graphics using a graphics processing system comprising:
a memory system;
a graphics processor; and
a cache system arranged between the memory system and the graphics processor and operable to transfer data between the memory system and the graphics processor for use by the graphics processor when generating a render output, the cache system comprising:
a first cache operable to transfer data to and from the graphics processor for use when generating a render output, wherein the first cache is used to cache data that is to be transferred between the graphics processor and the memory system via the cache system, independently of a type of data;
a second cache arranged and operable to transfer data between the first cache and the memory system, wherein the second cache is used only to cache certain types of data; and
a cache controller,
the method comprising:
when data is to be written from the first cache to the memory system during a graphics processing operation, the cache controller determining data type of the data to be written and, in dependence on the determined data type, either writing the data into the second cache without writing the data to the memory system, or writing the data to the memory system without storing the data in the second cache.

18. The graphics processor of claim 8, wherein the first cache is used to cache data that is to be transferred between the graphics processor and the memory system via the cache system independently of the type of data.

19. The method of claim 16, wherein the first cache is used to cache data that is to be transferred between the graphics processor and the memory system via the cache system independently of the type of data.

20. The graphics processor of claim 2, wherein the first cache is both read and write allocated.

* * * * *